United States Patent
Lim et al.

(10) Patent No.: US 9,883,362 B2
(45) Date of Patent: Jan. 30, 2018

(54) METHOD AND APPARATUS FOR TRANSMITTING AND RECEIVING VOICE CALL IN COMMUNICATION SYSTEM

(71) Applicant: Samsung Electronics Co., Ltd., Suwon-si, Gyeonggi-do (KR)

(72) Inventors: Han-Na Lim, Seoul (KR); Jung-Shin Park, Seoul (KR); Ji-Cheol Lee, Suwon-si (KR); Jin-Sung Lee, Suwon-si (KR); Hyung-Ho Lee, Seoul (KR); Ha-Kyung Jung, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 14/722,841

(22) Filed: May 27, 2015

(65) Prior Publication Data
US 2015/0350857 A1    Dec. 3, 2015

(30) Foreign Application Priority Data

May 29, 2014 (KR) .................. 10-2014-0065005

(51) Int. Cl.
*H04W 4/16* (2009.01)
*H04M 3/54* (2006.01)
(Continued)

(52) U.S. Cl.
CPC .............. *H04W 4/16* (2013.01); *H04M 3/54* (2013.01); *H04M 3/548* (2013.01); *H04W 4/008* (2013.01); *H04M 2242/30* (2013.01)

(58) Field of Classification Search
CPC ......... H04W 4/16; H04W 4/008; H04M 3/54; H04M 15/8271; H04M 2203/4545; H04L 29/0638; H04L 65/1096
See application file for complete search history.

(56) References Cited

U.S. PATENT DOCUMENTS 6,366,777 B1    4/2002  Uusitalo
7,680,491 B2    3/2010  Zabawskyj et al.
(Continued)

*Primary Examiner* — Andrew Wendell
(74) *Attorney, Agent, or Firm* — Jefferson IP Law, LLP

(57) ABSTRACT

The present disclosure relates to a communication method and a system for converging a 5$^{th}$-Generation (5G) communication system for supporting higher data rates beyond a 4$^{th}$-Generation (4G) system with a technology for Internet of Things (IoT). The present disclosure may be applied to intelligent services based on the 5G communication technology and the IoT-related technology, such as a smart home, a smart building, a smart city, a smart car, a connected car, health care, digital education, a smart retail, and security and safety services. A method and an apparatus for communicating voice calls in a communication system are provided. The apparatus includes a first terminal that is a representative terminal configured to receive a voice call sets up a function for using a call forwarding service with a second terminal that is an auxiliary terminal, when the first terminal detects an occurrence of an event complying with a certain criterion for performing a call forwarding service, to determine whether a call forwarding service with the second terminal is being executed, and to execute, unless the call forwarding service is being executed, the call forwarding service and to transfer a voice call received by the first terminal to the second terminal.

23 Claims, 21 Drawing Sheets

(51) Int. Cl.
   *H04M 15/00*      (2006.01)
   *H04L 29/06*      (2006.01)
   *H04W 4/00*       (2009.01)

(56) References Cited

U.S. PATENT DOCUMENTS

| | | |
|---|---|---|
| 7,912,464 B2 | 3/2011 | Jiang |
| 8,543,060 B2 | 9/2013 | Mutikainen et al. |
| 8,705,722 B2 | 4/2014 | Boni et al. |
| 9,332,107 B1* | 5/2016 | Persson .................. H04L 51/24 |
| 2004/0185888 A1 | 9/2004 | Serge |
| 2005/0075106 A1 | 4/2005 | Jiang |
| 2007/0213075 A1 | 9/2007 | Jiang |
| 2008/0292074 A1 | 11/2008 | Boni et al. |
| 2011/0250895 A1 | 10/2011 | Wohlert et al. |
| 2012/0309373 A1 | 12/2012 | Abogendia |
| 2013/0029671 A1 | 1/2013 | Islam |
| 2013/0102250 A1 | 4/2013 | Mutikainen et al. |
| 2013/0260761 A1 | 10/2013 | Walke et al. |
| 2013/0329878 A1* | 12/2013 | Cazanas .................. H04M 3/54 379/211.02 |
| 2014/0128063 A1* | 5/2014 | Chhabra ........... H04M 15/7652 455/435.1 |
| 2014/0161245 A1* | 6/2014 | Zises ....................... H04M 3/54 379/211.02 |
| 2015/0304829 A1* | 10/2015 | Zehavi ................... H04W 4/16 370/219 |
| 2016/0072955 A1* | 3/2016 | Barkan ............. H04M 3/42212 455/417 |

* cited by examiner

METHOD AND APPARATUS FOR TRANSMITTING AND RECEIVING VOICE CALL IN COMMUNICATION SYSTEM

CROSS-REFERENCE TO RELATED APPLICATION(S)

This application claims the benefit under 35 U.S.C. §119(a) of a Korean patent application filed on May 29, 2014 in the Korean Intellectual Property Office and assigned Serial number 10-2014-0065005, the entire disclosure of which is hereby incorporated by reference.

TECHNICAL FIELD

The present disclosure relates to a method and an apparatus for performing call forwarding when a plurality of terminals communicate voice calls in communication systems. More particularly, the present disclosure relates to a method for enabling a plurality of terminals each equipped with a cellular communication chip to communicate voice calls using the same phone number.

BACKGROUND

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

As the use and functionality of wearable devices continues to grow, users carry more and more handsets. Wearable devices are mostly equipped with short-range communication chips, such as Wi-Fi and Bluetooth modules. Accordingly, a wearable device may communicate with only terminals that are positioned within a short range, e.g., Bluetooth/Bluetooth Low Energy (BLE), or may cover a spot, e.g., Wi-Fi, not the nationwide service that would be covered with cellular communication. The user carrying multiple devices respectively having different communication chips independently use each device.

With a device only with short-range communication chips, the user may use additional services only when a plurality of terminals are positioned in the service coverage area. For example, when the user is wearing a smartwatch equipped with a Bluetooth chip, if a smartphone and the smartwatch are located in the service area, the smartwatch may receive, through Bluetooth, voice calls delivered from the communication network to the smartphone. However, the smartwatch, departing from the service area, cannot communicate with the smartphone through Bluetooth, and voice call communication using the smartwatch is unavailable. In other words, if the user wearing the smartwatch leaves behind the smartphone, it is impossible for the user to use nationwide voice call communication with his smartwatch.

To address such issue, the wearable device may have a chip for cellular communication. If so, however, a universal subscriber identity module (USIM) chip should also come along. As per the standards of the $3^{rd}$ Generation Partnership Project (3GPP) managing USIM-related standards, the USIM chip has the International Mobile Subscriber Identity (IMSI), indicating the user's ID, and the user's phone number, Mobile Station International ISDN Number (MSISDN) mapped one-to-one. In other words, each device carried by the user has its own phone number. For instance, a smartphone has phone number 1, and a wearable device has phone number 2. Thus, the user ends up having as many phone numbers as the number of devices he owns. Under such environment, the user should use two independent phone numbers in order to receive voice calls. The opposite party should call the user at phone number 1 to allow the user to receive voice calls through the smartphone and at number 2 through the smartwatch. For example, one user needs to use two phone numbers to receive voice calls through wireless communication, and this is quite bothering.

Another approach to enable communication of voice calls using multiple terminals is to use the call forwarding service that is an additional service that is offered from the mobile service provider. However, call forwarding services of the related art may be executed only when the devices are positioned in the shadow area, the phones stay turned-off, no response, or when a call-related event occurs that may be discovered by the network, but not when the devices' own issues arise, e.g., when the devices go away from each other.

Further, the user may desire to communicate voice calls with other devices, not the smartphone. For example, when the user is using his smartphone for purposes other than calling or call receiving, such as running a certain application on the phone, image capturing or filming using the phone, the user may want voice calls to be received by not his phone but the smartwatch. The call forwarding service of the related art serviced by the mobile service provider cannot respond to such issue.

Therefore, a need exists for a method and an apparatus for enabling a plurality of terminals each equipped with a cellular communication chip to communicate voice calls using the same phone number.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for enabling a plurality of terminals each equipped with a cellular communication chip to communicate voice calls using the same phone number.

Another aspects of the present disclosure is to provide a method and an apparatus for enabling a plurality of terminals each equipped with a cellular communication chip to communicate voice calls using the same phone number when certain conditions are met.

In accordance with an aspect of the present disclosure, a method for communicating a voice call between a plurality of terminals in a communication system is provided. The method includes setting up, by a first terminal that is a representative terminal for receiving a voice call, a function for using a call forwarding service with a second terminal that is an auxiliary terminal, when the first terminal detects an occurrence of an event complying with a certain criterion for performing a call forwarding service, determining whether a call forwarding service with the second terminal is being executed, and executing, unless the call forwarding service is being executed, the call forwarding service and transferring a voice call received by the first terminal to the second terminal.

In accordance with an aspect of the present disclosure, a terminal communicating a voice call in a communication system is provided. The terminal includes a communicating unit configured to communicate a voice call, an application performing unit configured to perform at least one application, a short-range communication unit configured to communicate data with another terminal using a short-range communication technology, a voice call managing unit configured to provide a call forwarding service transferring the voice call to the other terminal when an event complying with a certain criterion for performing the call forwarding service occurs, and an operating unit configured to manage data communication among the voice call managing unit, the application performing unit, and the short-range communication unit and to inform the voice call managing unit that the event complying with the certain criterion for performing the call forwarding service occurs, wherein the voice call managing unit is further configured to determine whether the call forwarding service is being executed when receiving a message indicating that the event complying with the certain criterion for performing the call forwarding service occurs from the operating unit and to execute the call forwarding service and to transfer the voice call received by the communicating unit to the other terminal unless the call forwarding service is being executed.

In accordance with an aspect of the present disclosure, a method for communicating a voice call in a communication system is provided. The method includes setting up, by a first terminal that is a representative terminal for receiving a voice call, a function for using a call forwarding service with a second terminal that is an auxiliary terminal and registering a call forwarding service with the second terminal in a server, transmitting, when detecting that an event complying with a certain criterion for performing the call forwarding service occurs by the first terminal, a request for the call forwarding service to the second terminal to the server so that the server establishes a voice call bearer between the server and the first terminal and between the server and the second terminal, and transferring, when receiving a voice call from a third terminal, the voice call from the third terminal to the second terminal through the voice call bearer between the server and the first terminal and between the server and the second terminal.

In accordance with an aspect of the present disclosure, a method for communicating a voice call in a communication system is provided. The method includes receiving a call forwarding service registration request message from a first terminal that is a representative terminal for receiving a voice call and a second terminal that is an auxiliary terminal and registering the first terminal and the second terminal in a call forwarding service terminal list, receiving a call forwarding service request message from the first terminal detecting that an event complying with a certain criterion for performing the call forwarding service occurs to the second terminal, establishing a voice call bearer between the first terminal and the second terminal, and receiving a voice call transmitted from the third terminal through the established voice call bearer from the first terminal and transferring the voice call to the second terminal.

In accordance with an aspect of the present disclosure, a terminal communicating a voice call in a communication system is provided. The terminal includes a communicating unit configured to communicate a voice call and a voice call managing unit configured to provide a call forwarding service with an auxiliary terminal, wherein the voice call managing unit is further configured to set up a function for using the call forwarding service with the auxiliary terminal, to register the call forwarding service with the auxiliary terminal in a server, to transmit, when detecting that an event complying with a certain criterion for performing the call forwarding service occurs by the first terminal, a request for the call forwarding service to the auxiliary terminal to the server to establish a voice call bearer between the server and the terminal and between the server and the auxiliary terminal, and to transfer, when receiving a voice call from an opposite terminal, the voice call from the opposite terminal to the auxiliary terminal through the voice call bearer between the server and the terminal and between the server and the auxiliary terminal.

In accordance with an aspect of the present disclosure, a server supporting to communicate a voice call in a communication system is provided. The server includes a communicating unit configured to communicate a message with the plurality of terminals and a call forwarding unit configured to provide a call forwarding service between the plurality of terminals, wherein the communicating unit is further configured to receive a call forwarding service registration request message from a first terminal that is a representative terminal for receiving a voice call and a second terminal that is an auxiliary terminal and to receive a call forwarding service request message to the second terminal from the first terminal detecting that an event complying with a certain criterion for performing a call forwarding service occurs, and the call forwarding unit is further configured to register, upon receiving the call forwarding service registration request message, the first terminal and the second terminal in a list of call forwarding service terminals, and to establish, upon receiving the call forwarding service request message, a voice call bearer with the first terminal and the second terminal, and to receive the voice call transmitted from the third terminal through the established voice call bearer from the first terminal and to transfer the voice call to the second terminal.

In accordance with an aspect of the present disclosure, a method for communicating a voice call in a communication system is provided. The method includes setting up, by a first terminal that is a representative terminal for receiving a voice call, a call forwarding service function with a second terminal that is an auxiliary terminal, detecting, by the first terminal, that an event complying with a certain criterion for performing the call forwarding service occurs and activating the call forwarding service function, receiving, by the first terminal, a voice call connection request message to the first terminal from the third terminal through a network and forwarding the voice call connection request message from the third terminal to the second terminal through the network, and receiving, by the first terminal, the voice call connection response message from the second terminal through the network and transferring the voice call connection response message to the third terminal through the network.

In accordance with an aspect of the present disclosure, a method for supporting to communicate a voice call in a communication system is provided. The method includes receiving, by a network device, a voice call connection request message to a first terminal from a third terminal while a call forwarding service function is configured between the first terminal that is a representative terminal for receiving a voice call and a second terminal that is an auxiliary terminal, transmitting the voice call connection request message to the first terminal, receiving the voice call connection request message from the first terminal and forwarding to the second terminal and receiving, by the network device, a voice call connection response message from the second terminal and transferring to the third terminal through the first terminal.

In accordance with an aspect of the present disclosure, a terminal communicating a voice call in a communication system is provided. The terminal includes a voice call managing unit configured to set up a call forwarding service function with an auxiliary terminal, and to activate, when detecting an event complying with a certain criterion for performing the call forwarding service occurs, the call forwarding service function, and a communicating unit configured to receive, under control of the voice call managing unit, a voice call connection request message to the terminal from an opposite terminal, to forward the voice call connection request message from the opposite terminal to the auxiliary terminal through the network, to receive a voice call connection response message from the auxiliary terminal through the network, and to transfer the voice call connection response message to the opposite terminal through the network.

In accordance with an aspect of the present disclosure, a network device supporting to communicate a voice call in a communication system is provided. The network device includes a call session controller configured to communicate a message between a first terminal that is a representative terminal for receiving a voice call and a third terminal and a switching unit configured to connect a second terminal that is an auxiliary terminal for receiving the voice call with the call session controller, wherein the call session controller is further configured to receive a voice call connection request message to the first terminal from the third terminal while a call forwarding service function is configured between the first terminal and the second terminal, to transfer the voice call connection request message to the first terminal, to receive the voice call connection request message from the first terminal and to forward through the switching unit to the second terminal, and wherein the call session controller is further configured to receive a voice call connection response message from the second terminal through the switching unit and to transfer the voice call connection response message to the third terminal through the first terminal.

In accordance with an aspect of the present disclosure, a method for supporting to communicate a voice call in a communication system is provided. The method includes receiving a message requesting to register and start a call forwarding service from a first terminal that is a representative terminal for receiving a voice call, the first terminal detecting that an event complying with a certain criterion for performing the call forwarding service occurs while a call forwarding service function is configured between the first terminal and a second terminal that is an auxiliary terminal and registering a call forwarding service for the first terminal, changing, when receiving a voice call connection request message to the first terminal registered in the call forwarding service from a third terminal, a recipient of the voice call connection request message to the second terminal based on information registered in the call forwarding service and forwarding the recipient-changed voice call connection request message to the second terminal, and receiving a voice call connection response message from the second terminal and transferring to the third terminal.

In accordance with an aspect of the present disclosure, a network device supporting to communicate a voice call in a communication system is provided. The network device includes a server configured to receive a message requesting to register and start a call forwarding service from a first terminal that is a representative terminal for receiving a voice call, the first terminal configured to detect that an event complying with a certain criterion for performing the call forwarding service occurs while a call forwarding service function is configured between the first terminal and a second terminal that is an auxiliary terminal and registering a call forwarding service for the first terminal and a call session managing unit configured to receive call forwarding service registration information from the server and, to change, when receiving a voice call connection request message to the first terminal registered in the call forwarding service from a third terminal, a recipient of the voice call connection request message to the second terminal based on information registered in the call forwarding service and to forward the recipient-changed voice call connection request message to the second terminal, and to receive a voice call connection response message from the second terminal and transferring to the third terminal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description in conjunction with the accompanying drawings, in which.

Throughout the drawings, like reference numerals will be understood to refer to like parts, components, and structures.

DETAILED DESCRIPTION

Figure 1:
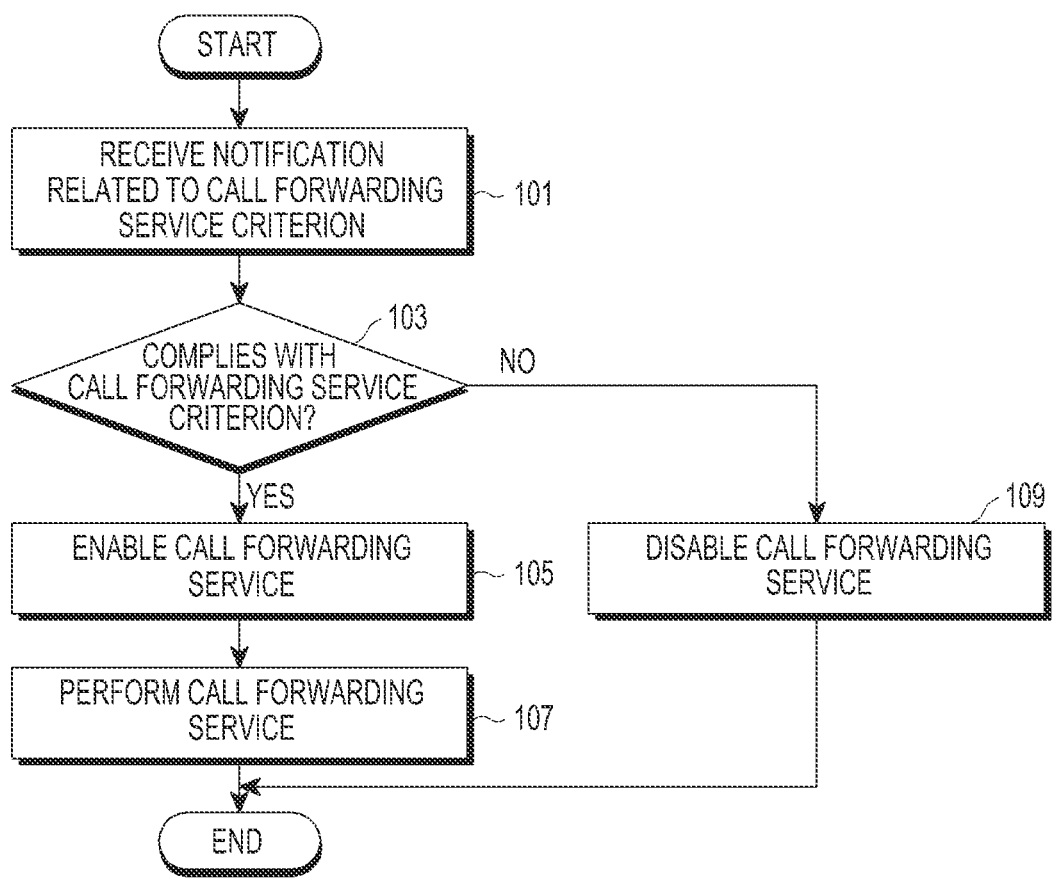
FIG. 1 is a flowchart illustrating a voice call management (VCM) operation according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

As used herein, the term "terminal" may be interchangeably used with the term "user equipment" (abbreviated "UE").

The description of embodiments of the present disclosure primarily targets evolved packet system (EPS), but the subject matter of the present disclosure may also be applicable to other communication systems with a similar technical background with minor changes without significantly departing from the scope of the present disclosure, and this may be possible under the determination of those skilled in the art to which the present disclosure pertains.

According to an embodiment of the present disclosure, there is proposed a voice call management (VCM) function for performing a call forwarding service in a terminal so as to enable a plurality of terminals to transmit and receive a voice call using the same phone number. According to an embodiment of the present disclosure, criteria for performing a VCM function are proposed. In addition proposed are a method for determining whether to use a call forwarding service using the VCM function according to the criteria and a specific call processing method using the VCM function. Further, there are proposed a terminal-based solution and a network-based solution according to an embodiment of the present disclosure.

First, a schematic operation of VCM is described according to an embodiment of the present disclosure.

FIG. 1 is a flowchart illustrating an operation of a VCM according to an embodiment of the present disclosure.

Referring to FIG. 1, the VCM receives a notification for an occurrence of an event related to a call forwarding service from an operating system of a terminal or a VCM-related module in the terminal in operation 101. The VCM identifies whether the event complies with a criterion for performing a call forwarding service in operation 103, and when the event complies with the criterion for performing the call forwarding service, the VCM enables the call forwarding service in operation 105 and performs the call forwarding service in operation 107. When the event does not comply with the criterion for performing the call forwarding service, the VCM disables the call forwarding service in operation 109.

According to an embodiment of the present disclosure, the following two may be considered as criteria for performing a call forwarding service:

First, when the distance between terminals is not less than a threshold.

Second, when a terminal to receive a voice call is executing a particular application.

The first criteria of when the distance between terminals is not less than a threshold for performing a call forwarding service is described below.

Figure 2A:
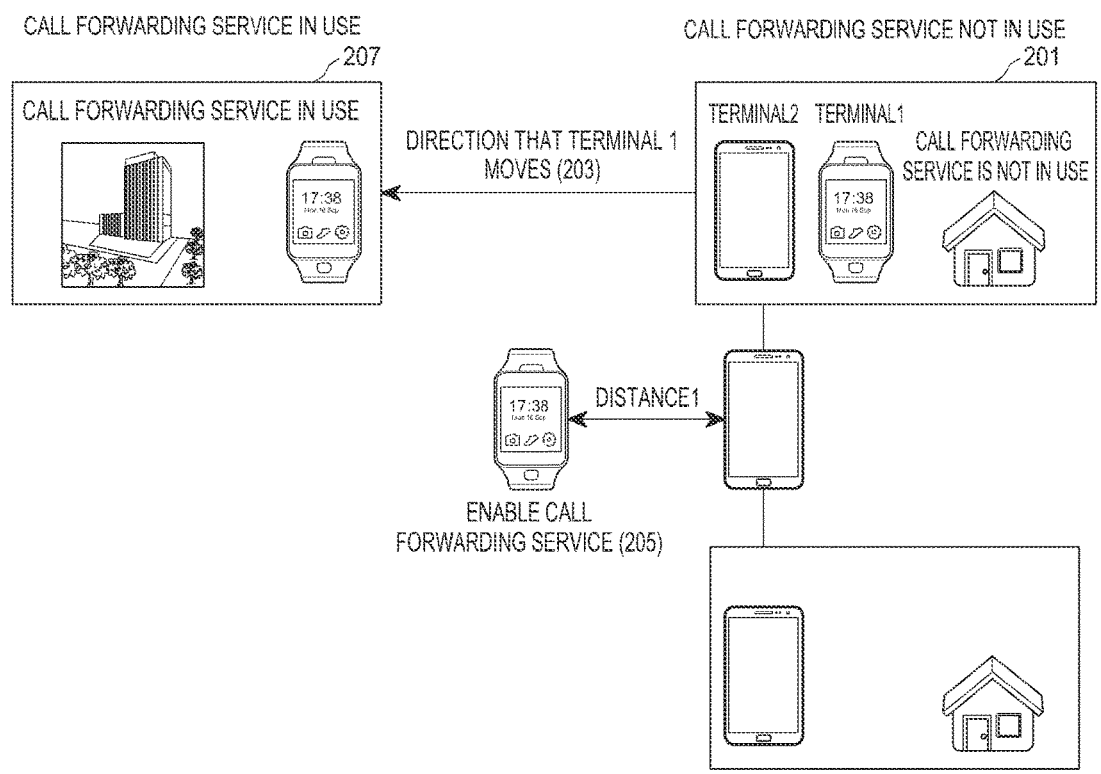
FIGS. 2A and 2B are views illustrating a process in which a VCM enables or disables a call forwarding service when a distance between terminals reaches a threshold according to embodiments of the present disclosure.
Figure 2B:
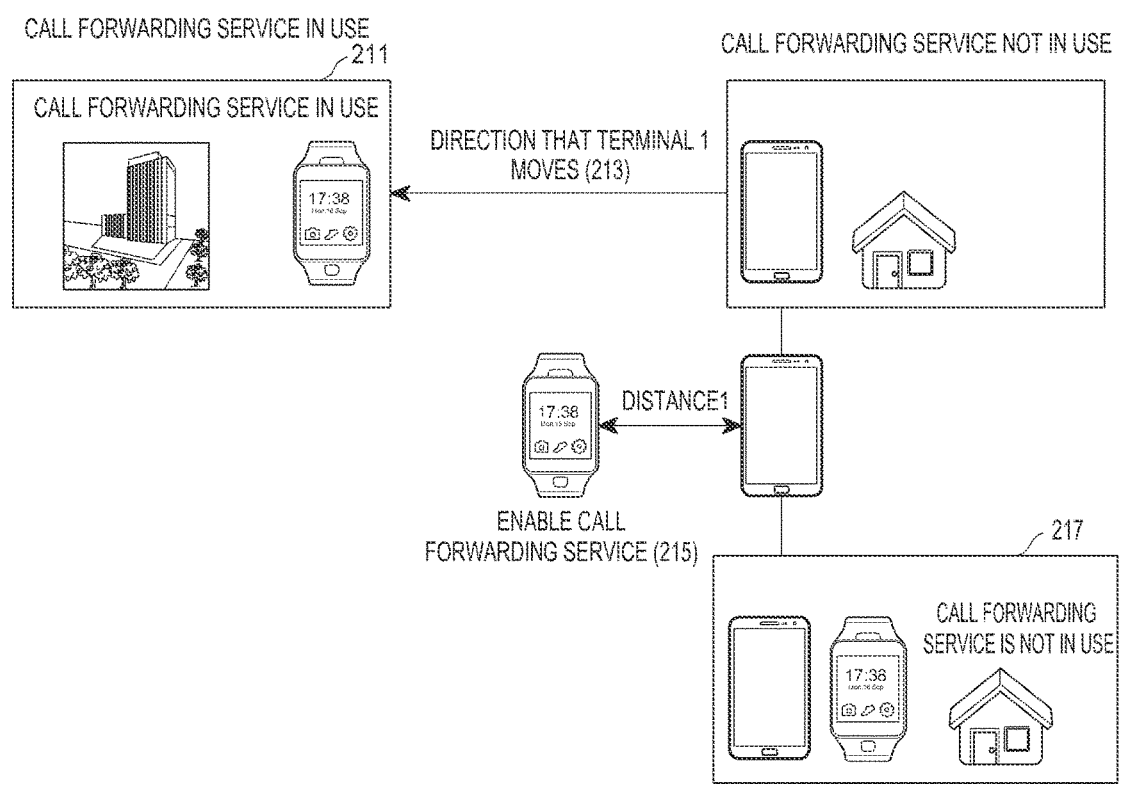

FIGS. 2A and 2B are views illustrating a process in which a VCM enables or disables a call forwarding service when a distance between terminals reaches a threshold according to embodiments of the present disclosure.

Referring to FIG. 2A, a user is using terminal 1 and terminal 2 in a home and does not use a call forwarding service in operation 201. In this case, the user sets terminal 2 as a representative terminal to receive a voice call service and uses the phone number of terminal 2 as a voice call communication phone number.

When the user moves to another place carrying only terminal 1 in operation 203, if arriving at a location where the distance between terminal 1 and terminal 2 is a threshold (=distance 1), the inter-terminal call forwarding service is enabled in operation 205. Thereafter, the user may perform voice call communication with terminal 1 in operation 207.

Referring to FIG. 2B, when the user using a call forwarding service with terminal 1 while staying in an office in operation 211 moves towards terminal 2 in operation 213, the distance between terminal 1 and terminal 2 reaches the threshold (=distance 1), and the call forwarding service is disabled in operation 215. Thereafter, the user may communicate a voice call with terminal 1 in operation 217.

Distance 1 that plays a role as a criterion for initiating or terminating the call forwarding service as shown in FIGS. 2A and 2B may be set by the user through an input device or user interface (UI). This may be known to the user through the display and UI of the terminal at the time of the initiation or termination of the call forwarding service.

According to an embodiment of the present disclosure, the VCM may perform registration in the operating system of the terminal so as to receive a notification as to the occurrence of an event regarding the distance for performing a call forwarding service from a short-range communication module supported by the terminal. In this case, the information for which a notification is to be received may be set by the user through, e.g., an input device or user interface (UI). The BLE may make use of the function of alerting when the distance between terminals departs from the threshold while conducting inter-terminal proximity monitoring according to a proximity profile, and the VCM may perform registration so as to receive the notification. In the case of Bluetooth, the VCM may perform registration so as to receive a notification at the time of being out of coverage area of Bluetooth communication or entering the coverage area of Bluetooth communication.

Further, the VCM may be configured to identify which terminal the user is actually carrying to perform a call forwarding service. This is done considering the situation where the user is on the move carrying not the auxiliary terminal but the voice call representative terminal. In other words, even when the condition of distance enabling a call forwarding service as shown in FIGS. 2A and 2B is met, the user need not use a call forwarding service if the user carries the voice call representative terminal (terminal 2). Thus, after identifying which terminal the user is actually carrying, the call forwarding service needs to be enabled or disabled.

To that end, the VCM detects a motion of the terminal using a motion sensor (e.g., an acceleration sensor, a gyro sensor, and the like) embedded in the terminal, and upon detecting a motion, determines that the user is carrying the terminal. The VCM may perform registration in the operating system of the terminal so as to receive motion-related information from the sensors embedded in the terminal. In this case, the detected information to be obtained may be set by the user through, e.g., an input device, a user interface (UI), and the like.

Figure 3:
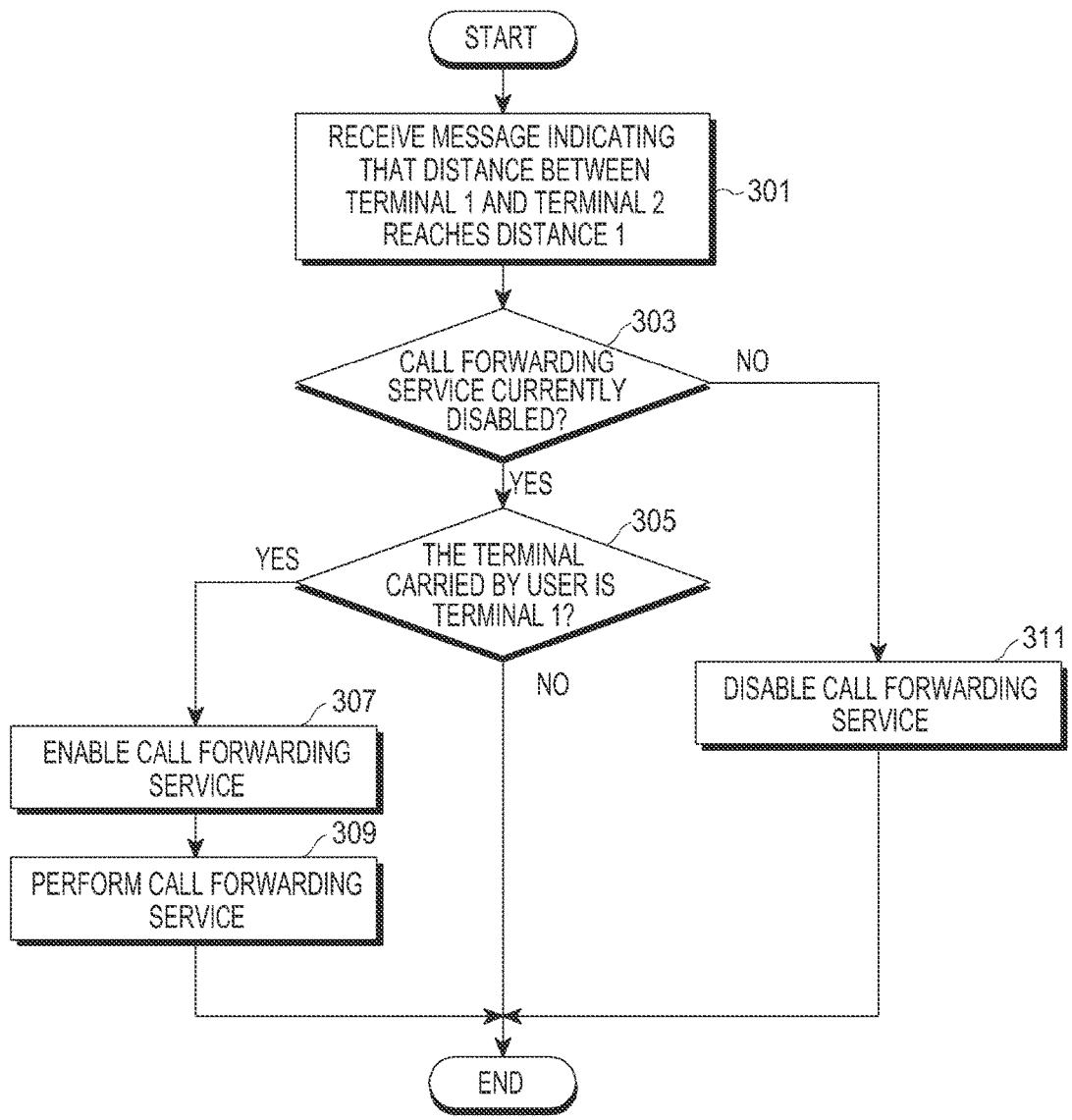
FIG. 3 is a flowchart illustrating an operation in which a VCM identifies an inter-terminal distance and a terminal carried by a user and performs a call forwarding service according to an embodiment of the present disclosure.

FIG. 3 is a flowchart illustrating an operation in which a VCM identifies an inter-terminal distance and a terminal carried by a user and performs a call forwarding service according to an embodiment of the present disclosure.

Referring to FIG. 3, the VCM receives a message indicating that the distance between terminal 1 and terminal 2 reaches distance 1 in operation 301 and identifies whether a call forwarding service currently remains disabled in operation 303. When the call forwarding service remains disabled, this may mean that the distance between terminal 1 and terminal 2 reaches distance 1 shifting from less than distance 1, the VCM identifies whether the terminal currently carried by the user is terminal 1 in operation 305 based on information collected from a sensor embedded in the terminal. When the user carries terminal 1, the VCM enables a call forwarding service to terminal 1 in operation 307 and performs a call forwarding service in operation 309. When the user carries terminal 2, no call forwarding service is performed. When the call forwarding service remains enabled, this may mean that the distance between terminal 1 and terminal 2 had been larger than distance 1 and while in use of the call forwarding service the distance between terminal 1 and terminal 2 was close to distance 1. Accordingly, the VCM disables the call forwarding service in operation 311.

A method for performing a call forwarding service when a representative terminal to receive a voice call is executing a particular application is described below.

The VCM stores a list of particular applications for which the VCM should be enabled when the applications are being executed. Examples of the particular applications may include applications that should be performed without interrupt, such as an audio-related application or a mobile banking application, and these may be set by the user.

According to an embodiment of the present disclosure, the VCM performs registration in the operating system or an application of the terminal so as to receive related information from the particular applications.

Figure 4:
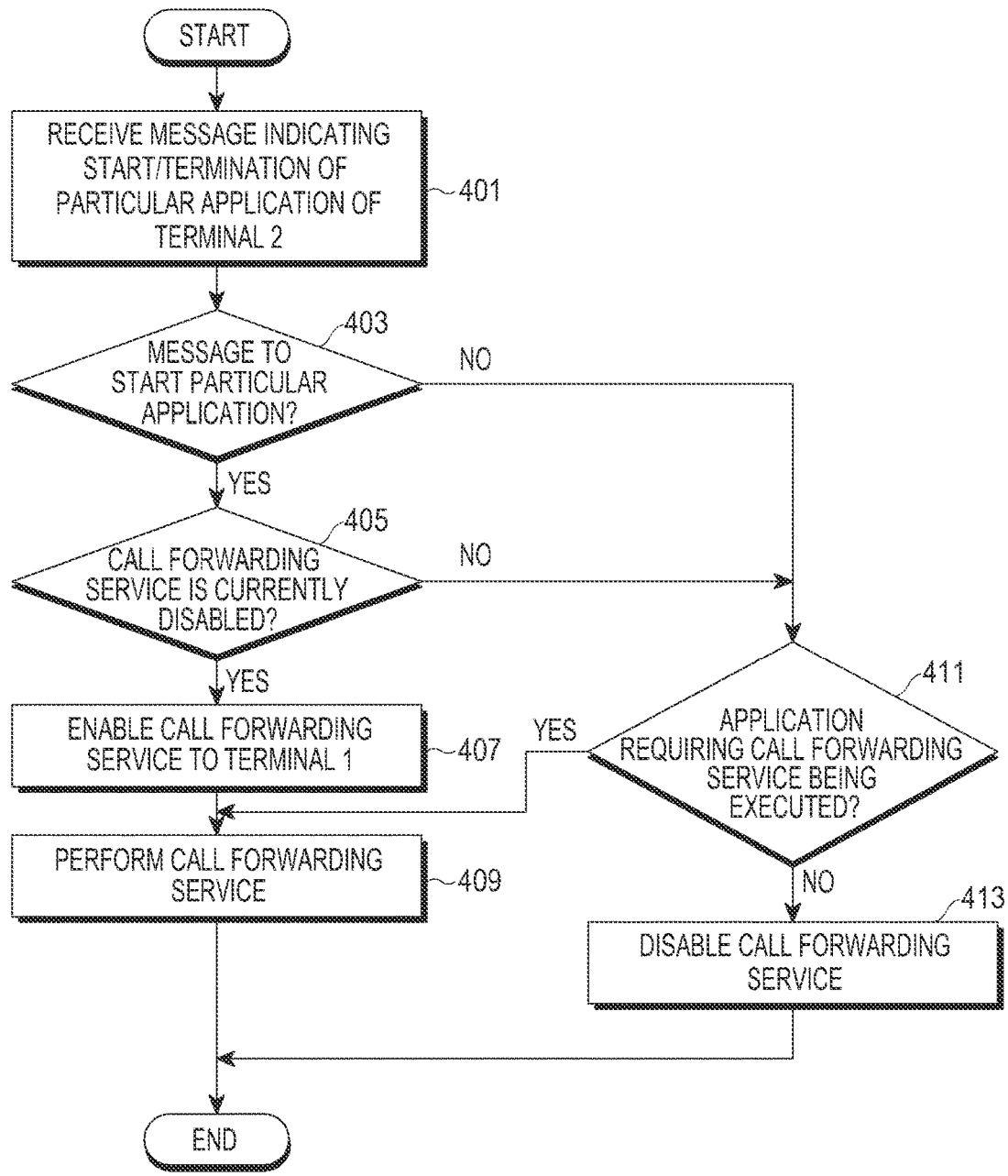
FIG. 4 is a flowchart illustrating an operation for performing a call forwarding service by a VCM according to whether a particular application is executed according to an embodiment of the present disclosure.

FIG. 4 is a flowchart illustrating an operation for performing a call forwarding service by a VCM according to whether a particular application is executed according to an embodiment of the present disclosure.

Referring to FIG. 4, when terminal 2 is set as a representative terminal to receive a voice call, the VCM receives a message indicating the start or termination of a particular application in operation 401. The VCM identifies whether the received message is a message indicating the start of the particular application in operation 403, and when the received message is a message indicating the start of the particular application, the VCM identifies whether the call forwarding service currently remains disabled in operation 405.

When the call forwarding service remains disabled, the VCM enables the call forwarding service to terminal 1 in order to continue to execute the application on terminal 2 in operation 407 and performs the call forwarding service in operation 409.

Unless the received message is a message indicating the start of the particular application, i.e., when the received message is a message indicating the termination of the particular application or when the received message is a message indicating the start of the particular application but the call forwarding service remains enabled, the VCM identifies whether the application requiring the call forwarding service is in execution in operation 411. When one or more applications requiring the call forwarding service are being executed, the VCM continues to perform the call forwarding service in operation 409, and when the application requiring the call forwarding service is not executed, the VCM disables the call forwarding service in operation 413.

Figure 5A:
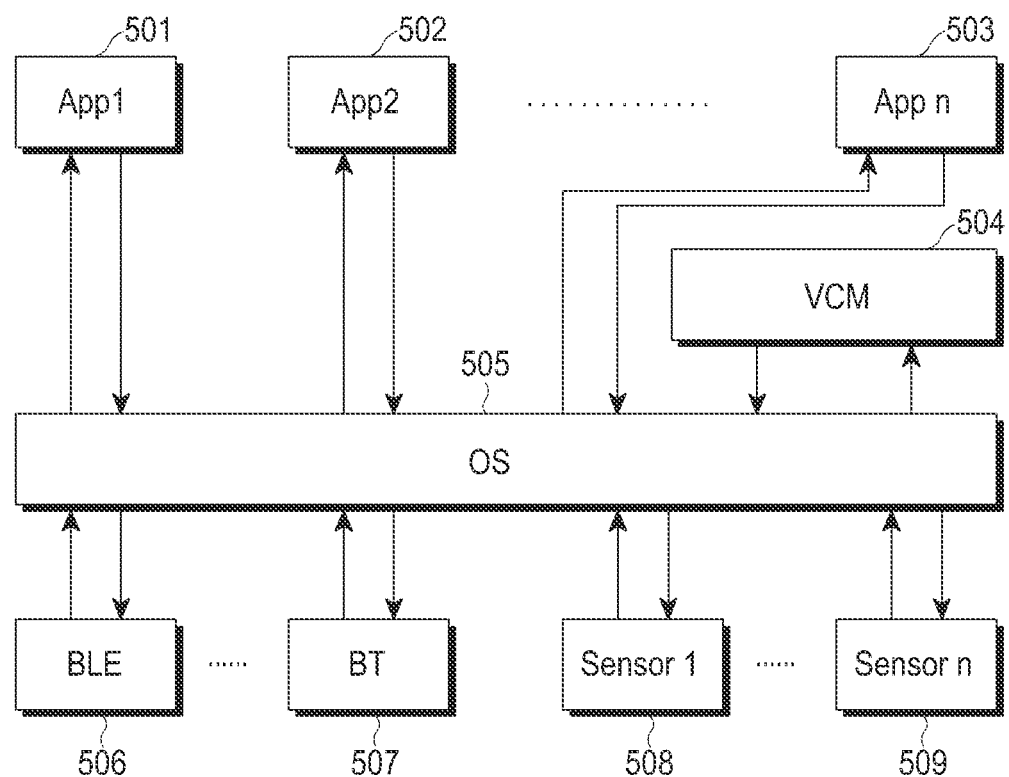
FIGS. 5A and 5B illustrate a configuration of a terminal for performing a call forwarding service according to an embodiment of the present disclosure.
Figure 5B:
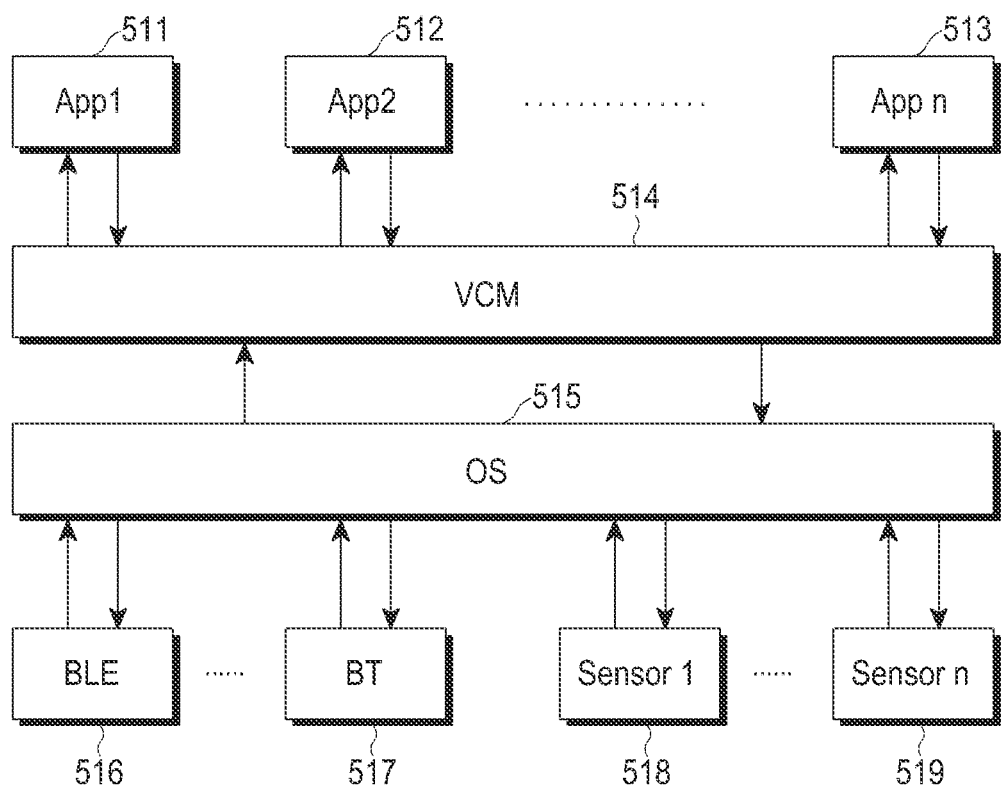

FIGS. 5A and 5B illustrate a configuration of a terminal for performing a call forwarding service according to an embodiment of the present disclosure.

FIG. 5A illustrates a model in which a VCM communicates information regarding call forwarding-related criteria through the operating system (OS) of a terminal.

Referring to FIG. 5A, an OS 505 of the terminal communicates data with multiple applications 501, 502, and 503, a VCM 504, multiple chips 506 and 507 for short-range communication, and multiple sensors 508 and 509. Further, the VCM 504 performing a call forwarding service according to an embodiment of the present disclosure receives a start/termination message of an application through the OS 505 for operations occurring in the applications 501, 502, and 503, a message related to a distance and service coverage area transferred from the short-range communication chips 506 and 507 through the OS 505, and information related to the motion of the terminal collected through the sensors 508 and 509 through the OS 505.

FIG. 5B illustrates a model in which a VCM communicates information regarding call forwarding-related criteria through an application and a terminal OS.

Referring to FIG. 5B, an OS 515 of the terminal communicates data with multiple applications 511, 512, and 513 through a VCM 514 and data with multiple chips 516 and 517 for short-range communication and multiple sensors 518 and 519. Accordingly, the VCM 514 performing a call forwarding service according to an embodiment of the present disclosure directly receives a start/termination message of application from the applications 511, 512, and 513, a message related to a distance and service coverage area transferred from the short-range communication chips 516 and 517 through the OS 515 and information related to the motion of the terminal collected through the sensors 508 and 509 through the OS 515.

Figure 6:
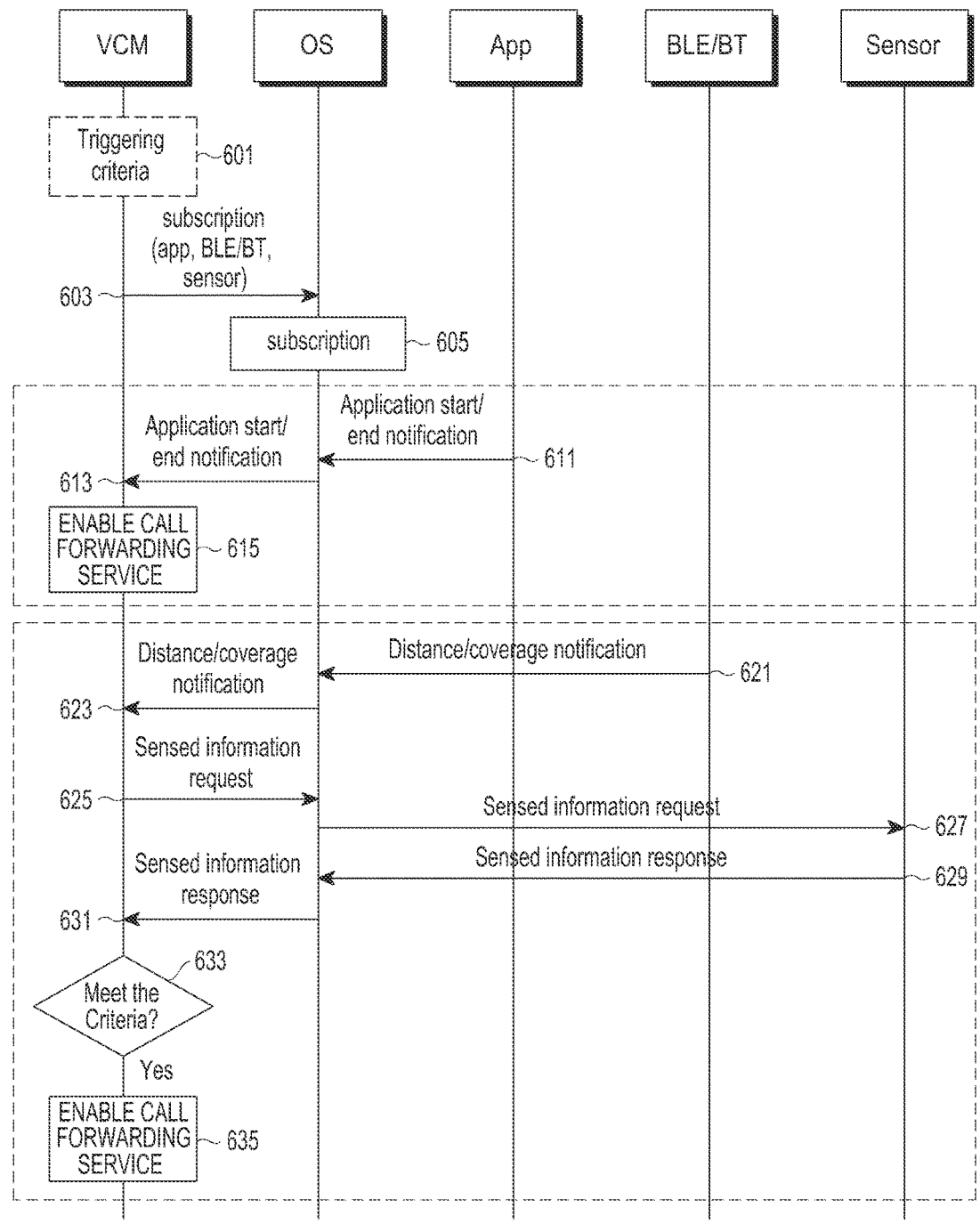
FIG. 6 illustrates a process in which a VCM performs registration in a terminal operating system (OS) or related module in a terminal so as to receive a notification as a criteria for performing a call forwarding service from the terminal OS or related module according to an embodiment of the present disclosure.

FIG. 6 illustrates a process in which a VCM performs registration in a terminal OS or related module in a terminal so as to receive a notification as a criteria for performing a call forwarding service from the terminal OS or related module according to an embodiment of the present disclosure.

Referring to FIG. 6, the VCM stores triggering criteria for performing a call forwarding service in operation 601 and transmits a request for a notification regarding information desired to be notified of to the OS in operation 603, and the OS registers the same in operation 605. The VCM may register a short-range communication module that may provide information on a list of particular applications for which to be desired to be notified of for the start/termination and a distance and a sensor from which information is to be obtained. However, the present disclosure is not limited thereto. The VCM may request a notification for any other information necessary to perform a call forwarding service and register the same. Thereafter, when a notification message for the registered information is transferred to the OS, the OS transmits the same to the VCM.

As an example, when a particular application is started or terminated, the application transmits a message indicating the start or termination to the OS in operation 611, and the OS transfers the same to the VCM in operation 613. Thereafter, the VCM enables the call forwarding service in operation 615.

As another example, the short-range communication module (BLE/BT) detects that the distance between terminals is larger than a threshold and reports the same to the OS in operation 621. The OS may transfer the information to the VCM in operation 623, and the VCM may identify the same by obtaining the motion information on the terminal from the sensor before determining whether to enable/disable the call forwarding service. For such purpose, the VCM transmits a request for sensor information to the OS in operation 625, and the OS transmits a request for information to the sensor in operation 627. The sensor transfers the requested information to the OS in operation 629, and the OS transfers the same to the VCM in operation 631. The VCM determines whether the information 623 and 631 received through the OS complies with the call forwarding service criteria in operation 633, and if complying with the criteria, the VCM enables the call forwarding service in operation 635.

Further, even when disabling the call forwarding service, the VCM performs a similar process to that shown in FIG. 6.

Although an example in which all information is received through the OS has been described in connection with FIG. 6, as described in connection with FIG. 5A, when the configuration is made as shown in FIG. 5B, the VCM may directly receive the related information from the application without passing through the OS in operations 611 and 613.

A specific method for performing a call forwarding service is described below according to an embodiment of the present disclosure.

In the following embodiment of the present disclosure, terminals are classified into three groups depending on voice call configuration methods, and methods for performing a call forwarding service for the methods, respectively, are proposed.

1) Packet Switch (PS)/WiFi terminal: Voice over Internet Protocol (VoIP) terminal. Transmit and receive a voice call by a real-time transport protocol (RTP) through a packet network.

2) Internet Protocol (IP) Multimedia System (IMS)/Voice over Long Term Evolution (VoLTE) terminal: Connect a voice call using standardized IMS signaling through an LTE network.

3) Circuit Switch (CS) terminal: Connect a voice call through a circuit network (switch).

First, a method for performing a terminal-based call forwarding service is described.

According to a first embodiment of the present disclosure, there is proposed a method for transferring voice data received by a voice call representative terminal to an auxiliary terminal opposite party's terminal. For example, this method is to transfer receiving voice call data from the opposite party's terminal to the auxiliary terminal and to transfer transmitting voice call data from the auxiliary terminal to the opposite party's terminal.

Figure 7:
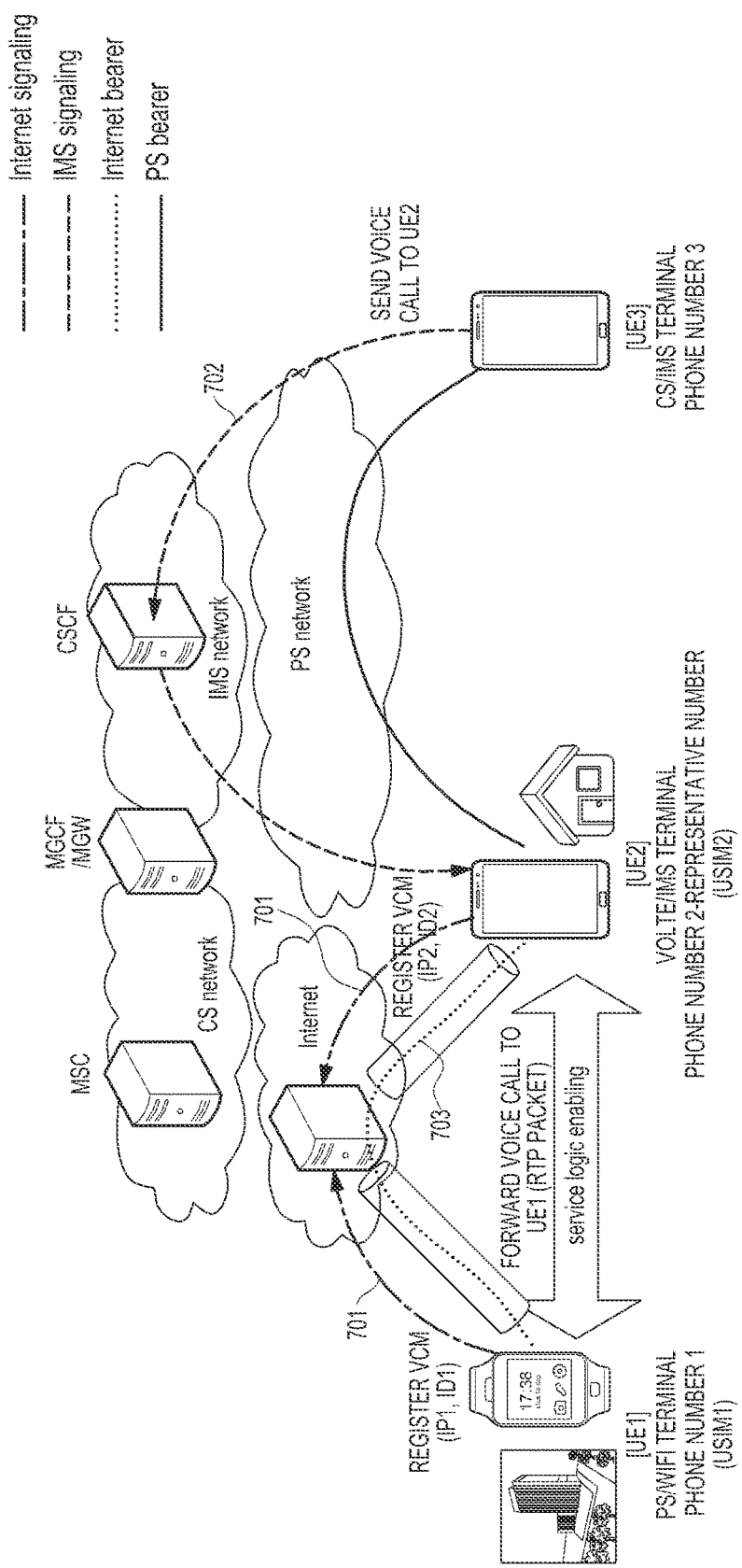
FIG. 7 is a view illustrating a signaling pathway and a pathway through which data is transmitted when a representative terminal, UE2, receives a voice call from an opposite party's terminal, UE3, and transfers to an auxiliary terminal, UE1 according to an embodiment of the present disclosure.

FIG. 7 is a view illustrating a signaling pathway and a pathway through which data is transmitted when a representative terminal, UE2, receives a voice call from an opposite party's terminal, UE3, and transfers to an auxiliary terminal, UE1, according to a first embodiment of the present disclosure.

Referring to FIG. 7, UE1 is an auxiliary terminal and is a PS/WiFi terminal. UE1 has a phone number 1 (USIM 1). UE2 is a representative terminal and is a VoLTE/IMS terminal. UE2 has a phone number 2 (USIM 2). UE3 is a transmitting terminal and is a CS/IMS terminal UE3 has a phone number 3. Although an example in which UE3 is an IMS terminal is described in connection with FIG. 7, UE3 may be a terminal that is not an IMS terminal.

When UE1 and UE2 are using a call forwarding service, the VCM of UE2 transfers a voice call 701 that is received from UE3 through a voice call dedicated connection (voice bearer) to the VCM of UE1 through a normal Internet connection (Internet bearer). Further, the VCM of UE2 transfers a transmitting call from the VCM of UE1 that is received through a normal Internet bearer 701 to UE3. In other words, unlike UE2 and UE3, UE2 and UE1 use the normal Internet bearer without configuring or using a voice bearer, to communicate a voice call through voice RTP packet communication at the application end. An IMS voice call is set up between UE3 and UE2, and the voice call 702 is transferred from UE3 to UE2 through a PS bearer. There is required a server for providing a voice call service for a connection between UE1 and UE2. The server may be connected with UE1 and UE2 through the Internet 703. According to an embodiment of the present disclosure, a call forwarding service may be used without the need of adding a function to the communication network that is currently being used.

Figure 8:
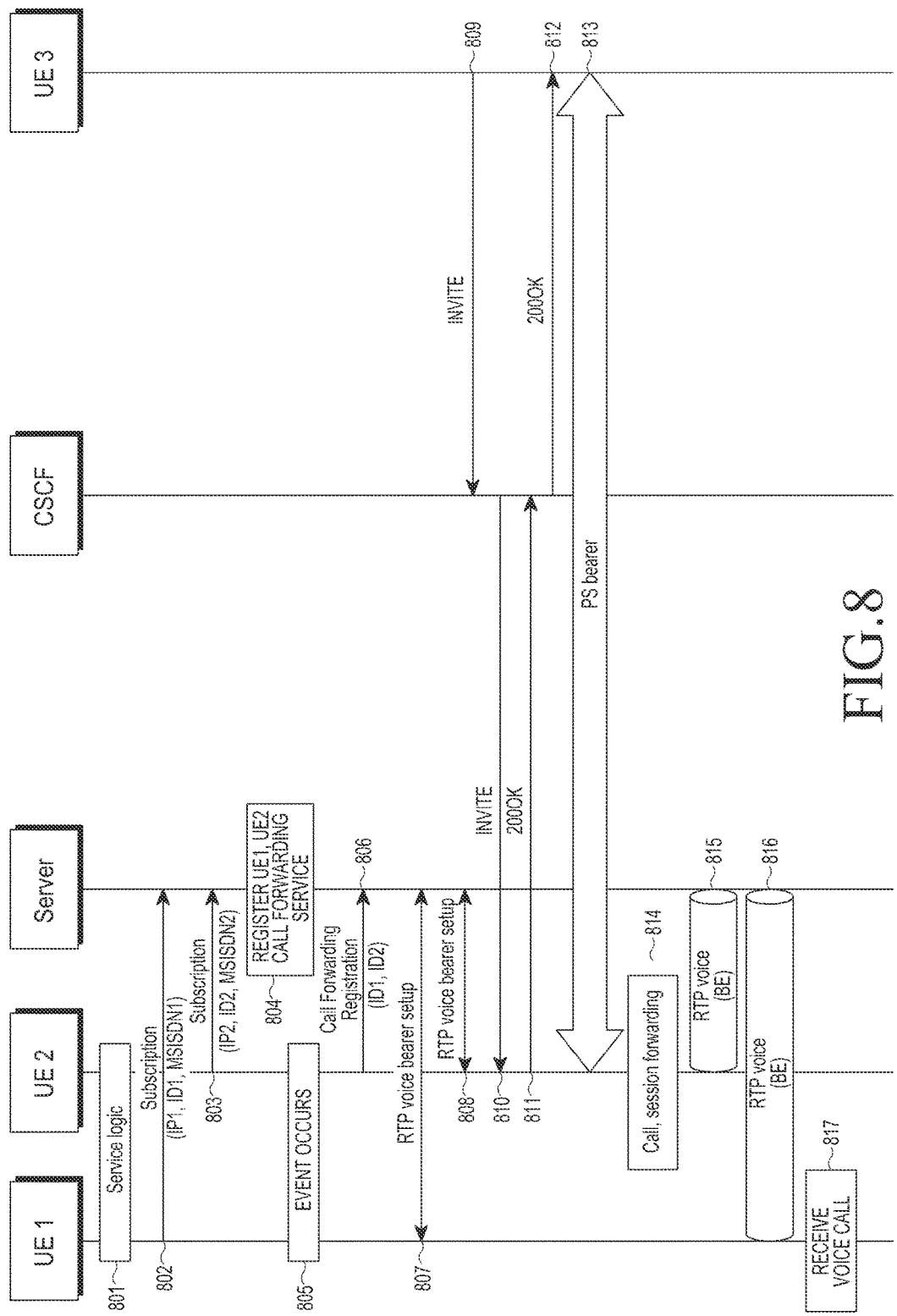
FIG. 8 is a view illustrating a call forwarding process when a representative terminal (UE2) receives a voice call from an opposite party's terminal (UE3) and transfers to an auxiliary terminal (UE1) according to a first embodiment of the present according to an embodiment of the present disclosure.

FIG. 8 is a view illustrating a call forwarding process when a representative terminal (UE2) receives a voice call from an opposite party's terminal (UE3) and transfers to an auxiliary terminal (UE1) according to a first embodiment of the present disclosure. It is assumed in connection with FIG. 8 that UE1, UE2, and UE3 are terminals having the same conditions as described in connection with FIG. 7.

Referring to FIG. 8, UE1 and UE2 have a VCM. The VCM of each terminal identifies criteria for initiating a call forwarding service in the terminal in operation 801. The VCM of UE1 registers itself in a voice call server for a call forwarding service in operation 802. In this case, the VCM of UE1 registers an IP address (IP1) of UE1, an IDentification (ID) (ID1) of UE1, and a representative phone number (MSISDN1) in the server. The VCM of UE2 also registers itself in the voice call server in operation 803. In this case, the VCM of UE1 registers an IP address (IP2) of UE2, an ID (ID2) of UE2, and a representative phone number (MSISDN2) in the server. Operations 802 and 803 may be changed in order. The voice call server registers UE1 and UE2 in a voice call forwarding service in operation 804. Thereafter, when an event occurs satisfying criteria for initiating a call forwarding service in operation 805, the VCM of UE2 transmits a request for call forwarding service to the voice call server so that the voice call of UE2 is call forwarded to UE1 in operation 806. In this case, the request for call forwarding service may also be made by the VCM of UE1. The voice call server sets up an RT session with UE2 using the pre-registered IP address (IP2) of UE2 in operation 807.

Further, the voice call server sets up an RT session with UE1 using the pre-registered IP address (IP1) of UE1 in operation 808. When an RTP session is set up after transmission and reception of a voice call, the time for call setup may be increased. Accordingly, previously setting up an RTP session may reduce the time for call set up when a voice call is communicated. Thereafter, UE3 transmits a request for a standardized IMS voice call to UE2 through a CSCF in operations 809 and 810, and UE2 responds to UE3 through the CSCF in operations 811 and 812. Accordingly, an IMS voice call is set up between UE3 and UE2, and the voice call is transferred from UE3 to UE2 through a PS bearer in operation 813. The VCM of UE2 transfers voice call data received from UE3 to the voice call server through the pre-set RTP voice bearer in operations 814 and 815. The voice call server transfers the voice call data received from the VCM of UE2 to the VCM of UE1 through an already set RTP voice bearer in operation 816. Accordingly, UE1 receives a voice call from UE3 in operation 817. For example, voice data from the opposite party's terminal UE3 may be transferred to the auxiliary terminal (UE1) through the pathway indicated by operations 813 to 816 of FIG. 8.

Figure 9:
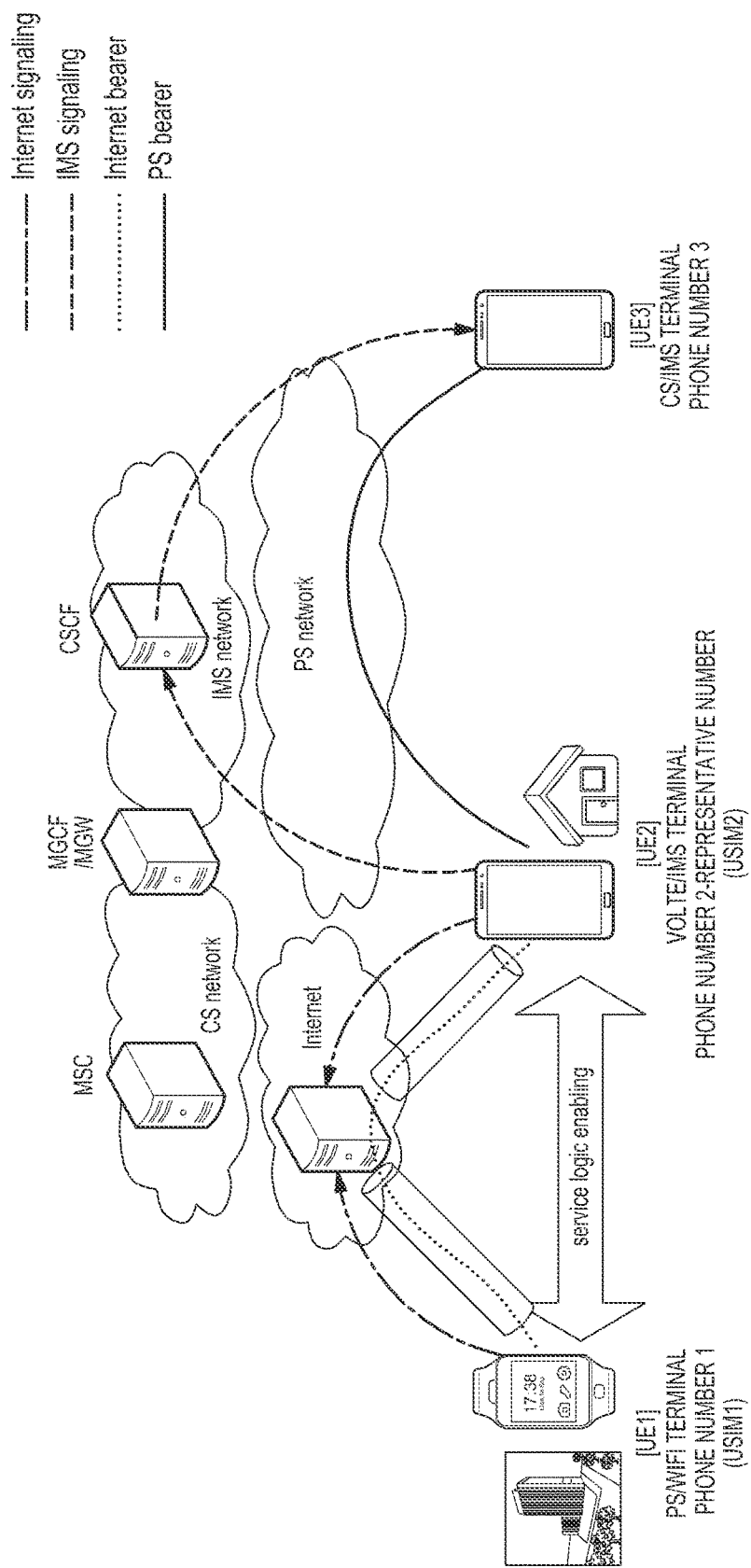
FIG. 9 is a view illustrating a signaling pathway and a pathway through which data is transmitted when a representative terminal (UE2) receives a voice call from an auxiliary terminal (UE1) and transfers to an opposite party's terminal (UE3) in a call forwarding service according to a first embodiment of the present according to an embodiment of the present disclosure.

FIG. 9 is a view illustrating a signaling pathway and a pathway through which data is transmitted when a representative terminal (UE2) receives a voice call from an auxiliary terminal (UE1) and transfers to an opposite party's terminal (UE3) in a call forwarding service method according to a first embodiment of the present disclosure.

Referring to FIG. 9, UE1 is an auxiliary terminal and is a PS/WiFi terminal. UE1 has a phone number 1 (USIM 1). UE2 is a representative terminal and is a VoLTE/IMS terminal. UE2 has a phone number 2 (USIM 2). UE3 is a transmitting terminal and is a CS/IMS terminal UE3 has a phone number 3. Although an example in which UE3 is an IMS terminal is described in connection with FIG. 9, UE3 may be a terminal that is not an IMS terminal.

When UE1 and UE2 are using a call forwarding service, the VCM of UE2 transfers a transmitting call received from the VCM of UE1 through a normal Internet connection to the UE3 through a voice call dedicated connection (voice bearer). In other words, unlike UE2 and UE3, UE2 and UE1 use the normal Internet bearer without configuring or using a voice bearer, to communicate a voice call through voice RTP packet communication at the application end. There is required a server for providing a voice call service for a connection between UE1 and UE2. The server may be connected with UE1 and UE2 through the Internet. According to an embodiment of the present disclosure, a call forwarding service may be used without the need of adding a function to the communication network that is currently being used.

Figure 10:
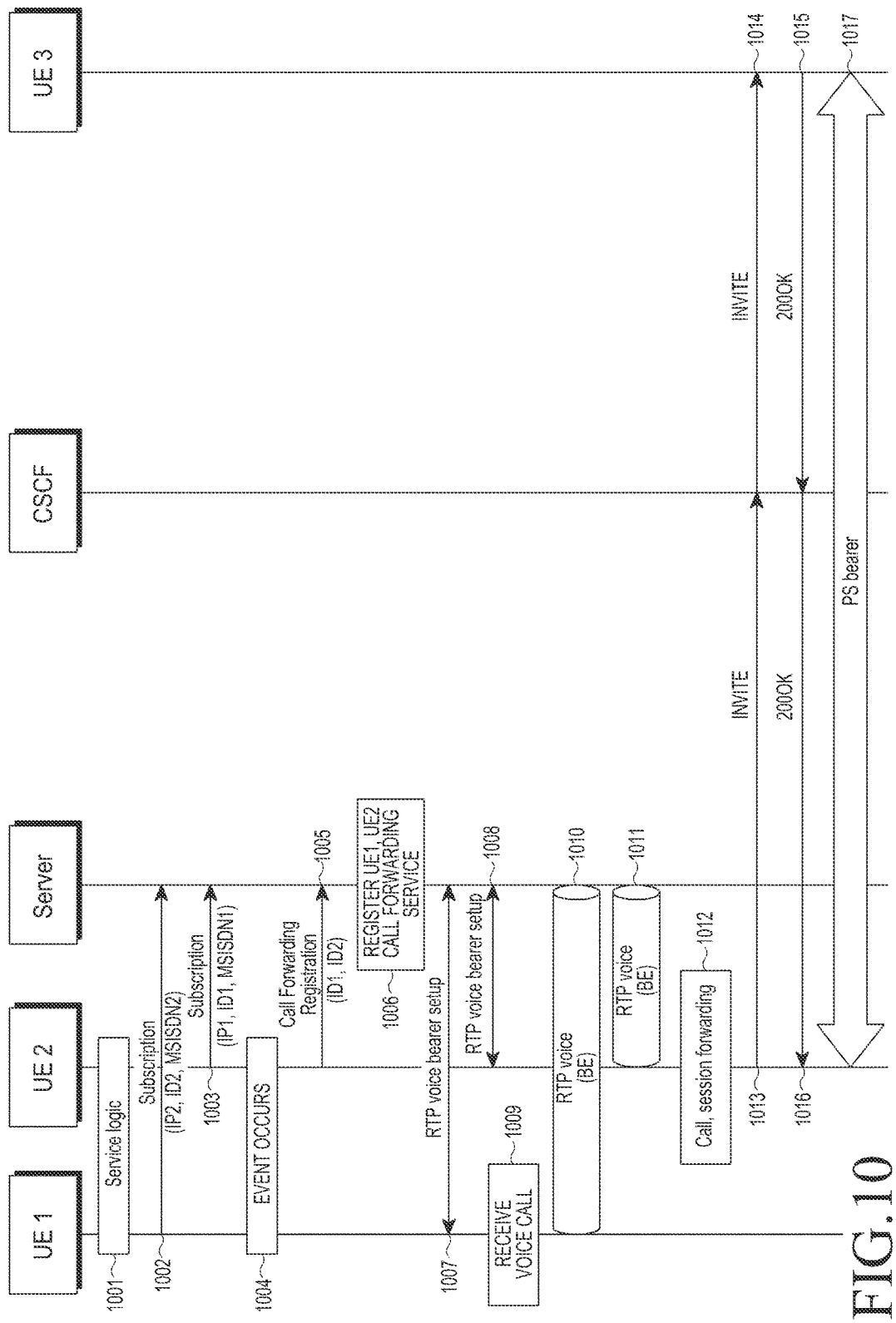
FIG. 10 is a view illustrating a call forwarding process when a representative terminal (UE2) receives a voice call from an auxiliary terminal (UE1) and transfers to an opposite party's terminal (UE3) according to a first embodiment of the present disclosure.

FIG. 10 is a view illustrating a call forwarding process when a representative terminal (UE2) receives a voice call from an auxiliary terminal (UE1) and transfers to an opposite party's terminal (UE3) according to a first embodiment of the present disclosure. It is assumed in connection with FIG. 10 that UE1, UE2, and UE3 are terminals having the same conditions as described in connection with FIG. 9.

Referring to FIG. 10, operations 1001 to 1008 are the same as those in FIG. 8. In this case, the call forwarding service registration of operation 1006 may be performed at any time from when UE1 and UE2 register service in the voice call server until the RTP voice bearer setup of operations 1007 and 1008.

Thereafter, UE1 transmits a voice call in operation 1009 and transfers voice call data to the voice call server through a set RTP voice bearer in operation 1010. The voice call server transfers voice call data from UE1 to UE2 through the set RTP voice bearer in operations 1011 and 1012. The VCM of UE2 sets up an IMS voice call through a standardized IMS voice call setup process to UE3 in operations 1013, 1014, 1015, and 1016, and UE3 receives a voice call from UE1 through a PS bearer from UE2. For example, voice data from the auxiliary terminal (UE1) may be transferred to the opposite party's terminal (UE3) through the pathway indicated by operations 1010, 1011, 1012, and 1017 of FIG. 10.

Figure 11:
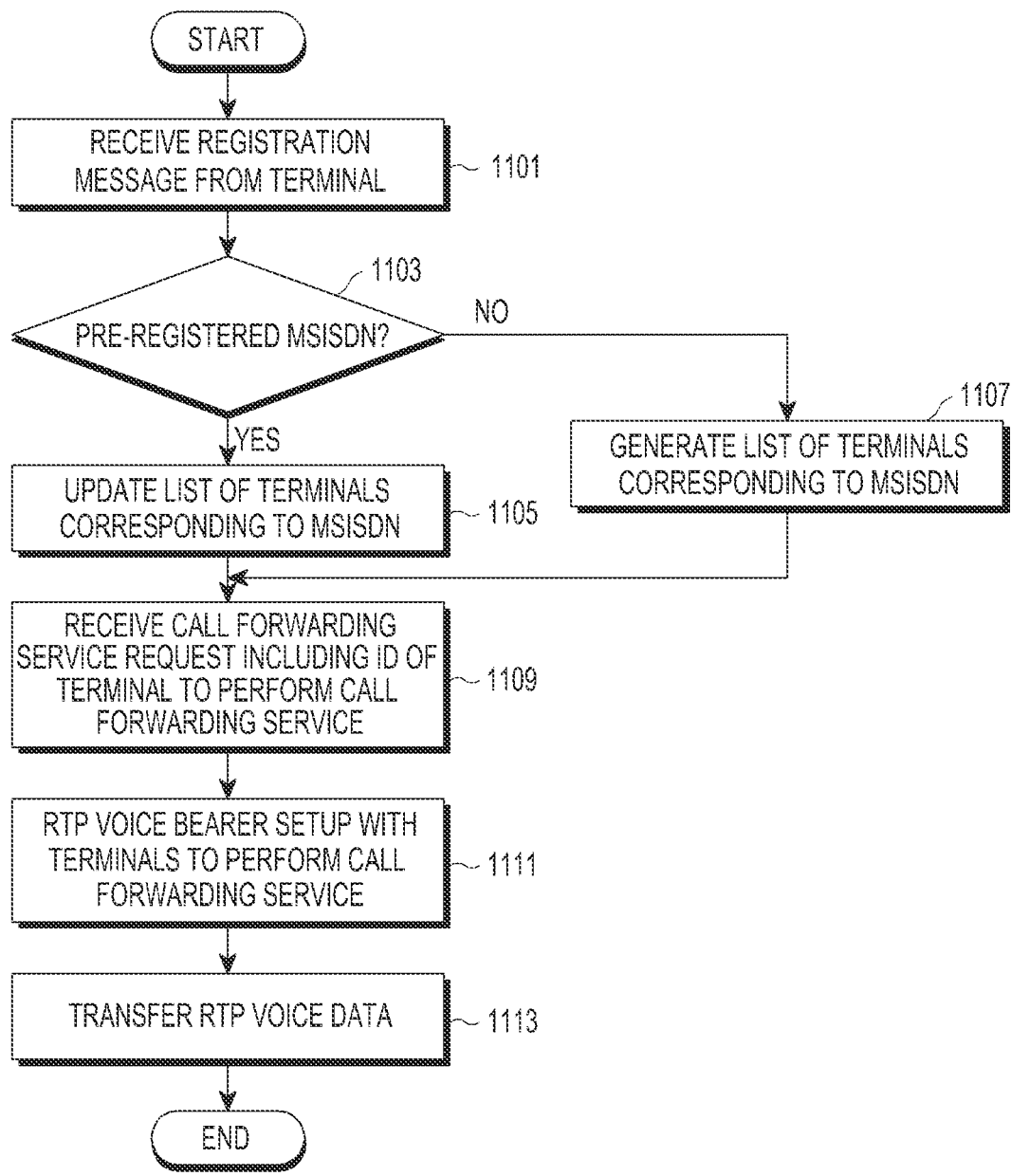
FIG. 11 is a flowchart illustrating an operational procedure of a voice call server for providing a call forwarding service according to a first embodiment of the present disclosure.

FIG. 11 is a flowchart illustrating an operational procedure of a voice call server for providing a call forwarding service according to a first embodiment of the present disclosure.

Referring to FIG. 11, the voice call server receives a call forwarding service registration message from the representative terminal and the auxiliary terminal in operation1101 and identifies the phone number of the terminal that has requested to register a call forwarding service in operation 1103. When the phone number is previously registered, the voice call server updates the list of the terminal corresponding to the phone number in operation 1105, and when the phone number is not a phone number previously registered, the voice call server generates a list of terminals corresponding to the phone number in operation 1107.

Thereafter, upon reception of a call forwarding service request including an ID of a terminal to perform a call forwarding service in operation 1109, the voice call server sets up an RTP voice bearer with terminals with which to perform a call forwarding service in operation 1111 and transfers voice call data between the terminals through the set RTP voice bearer in operation 1113.

A method in which a voice call representative terminal changes signaling transferred to a network and directly connects an auxiliary terminal with an opposite party's terminal is described below according to a second embodiment of the present disclosure. For example, when the representative terminal receives a voice call setup request from the opposite party's terminal, the representative terminal transfers the same to the auxiliary terminal, and the auxiliary terminal and the opposite party's terminal directly connect a voice call. The difference between the first embodiment of the present disclosure and the second embodiment of the present disclosure is that the auxiliary terminal and the opposite party's terminal directly establish a voice call dedicated connection through transferring and changing signaling to communicate voice call data. The call forwarding service according to the second embodiment may be offered without adding a function to the network.

It has been assumed in the second embodiment of the present disclosure that the auxiliary terminal is a CS terminal with a phone number (MSISDN1), the representative terminal is an IMS/VoLTE terminal embedded with a USIM and having a representative phone number (MSISDN2), and the opposite party's terminal is a CS/IMS terminal with a phone number (MSISDN3). However, the present disclosure is not limited thereto.

Figure 12:
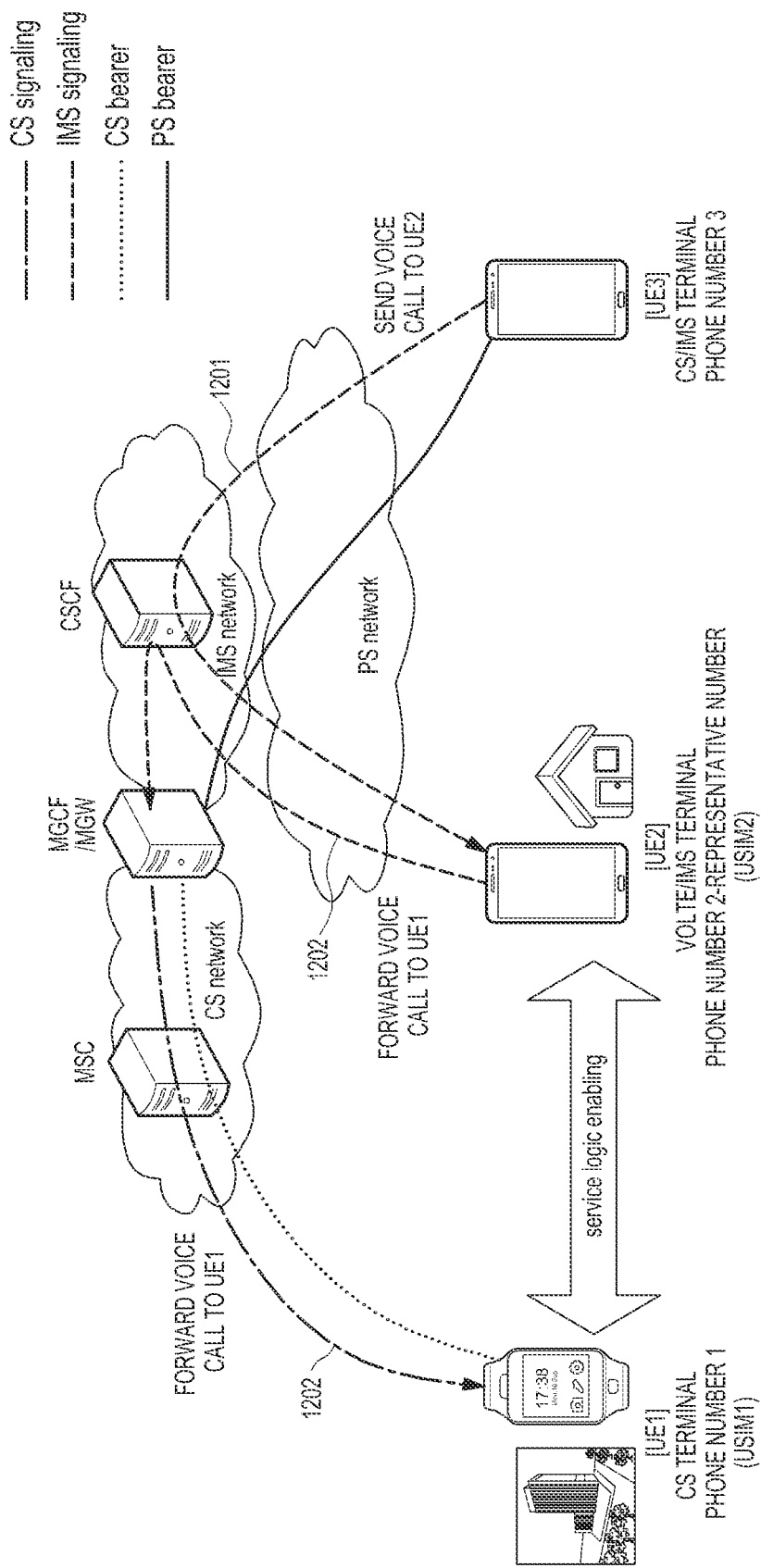
FIG. 12 is a view illustrating a signaling pathway and a pathway through which data is transmitted when a representative terminal (UE2) receives a voice call setup request from an opposite terminal (UE3) in a call forwarding service method according to a second embodiment of the present disclosure.

FIG. 12 is a view illustrating a signaling pathway and a pathway through which data is transferred when a representative terminal (UE2) receives a voice call setup request for setting up a voice call from an opposite party's terminal (UE3) in a call forwarding service method according to a second embodiment of the present disclosure.

Referring to FIG. 12, the UE2 transfers the voice call setup request 1201 from UE3 to an auxiliary terminal (UE1) so that UE3 and UE1 directly connect a voice call 1202 in a call forwarding service method. When UE1 and UE2 are using a call forwarding service, if UE3 transmits a voice call to UE2, the voice call is transferred through an IMS network to UE2, and UE2 forwards the voice call through the IMS network and a CS network. Thereafter, UE1 may directly exchange voice call data with UE3. As such, according to the second embodiment of the present disclosure, the representative terminal involves only signaling related to the voice call setup, and the voice call data is directly communicated between the auxiliary terminal and the opposite party's terminal.

Figure 13:
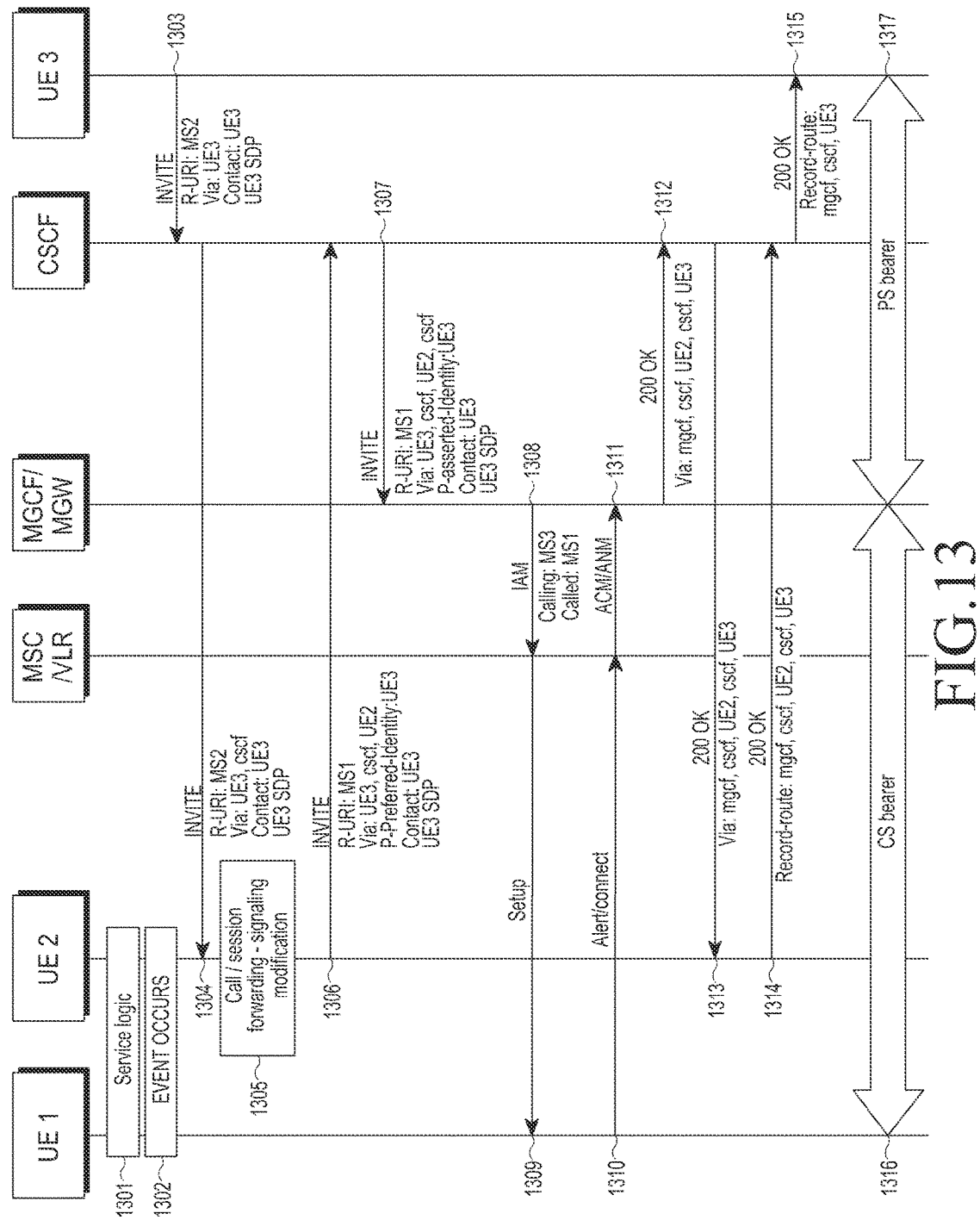
FIG. 13 illustrates a method of connecting a voice call when a representative terminal (UE2) receives a voice call setup request from an opposite terminal (UE3) in a call forwarding service according to a second embodiment of the present disclosure.

FIG. 13 illustrates a method of connecting a voice call when a representative terminal (UE2) receives a voice call setup request from an opposite party's terminal (UE3) in a call forwarding service method according to a second embodiment of the present disclosure.

Referring to FIG. 13, UE1 and UE2 have a VCM. The UE2 transfers the voice call request from UE3 to an auxiliary terminal (UE1) so that UE3 and UE1 directly connect a voice call in a call forwarding service method. The VCM of each terminal identifies criteria for initiating a call forwarding service in the terminal in operation 1301. Thereafter, when an event occurs meeting criteria for initiating a call forwarding service in operation 1302, a call forwarding service is enabled. Thereafter, UE3 transmits a request for a voice call to UE2 in operations 1303 and 1304. In operations 1303 and 1304 of FIG. 13, R-URI denotes a recipient (destination), the term "via" denote nodes through which a call request message passes, contact denotes an IP address of a transmitting terminal, UE3 SDP denotes information (e.g., a codec, an IP address, and the like) configured when UE3 establishes a voice call data dedicated connection. From the content contained in the message denoted by operations 1303 and 1304, it can be seen that a CSCF has been added to via while UE3 passes through a CSCF. The VCM of UE2 receives an IMS voice call connection request message through the CSCF in UE3, and then, prepares for transfer of the same to UE1 in operation 1305. The VCM of UE2 transmits an INVITE message to UE1. In this case, UE2 includes information on UE3 (i.e., P-Preferred-Identity: UE3, Contact: UE3, and UE3 SDP) that has been included in the INVITE message received from the CSCF in 1304, rather than putting its own information (information on UE2) in the INVITE message. P-Preferred-identity is one for the terminal to notify an ID desired to use in the network.

The INVITE message from UE2 is transferred to UE1 receiving a CS voice call service via the CSCF, MGCF/MGW and MSC/VLR according to an existing IMS signaling method in operations 1306, 1307, 1308, and 1309. Through this process, UE1 establishes a CS bearer in operation 1316 through which to directly communicate voice call data with UE3.

UE1 responds to the voice call connection request message in operations 1310 and 1311. A 200 OK message is transferred to UE2 according to an existing IMS signaling method in operations 1312 and 1313. UE2 transfers the response message received from UE1 to UE3 in operations 1314 and 1315. Through this process, UE3 establishes a PS bearer in operation 1317 through which to directly communicate voice call data with UE1. Thereafter, UE1 and UE3 may directly communicate voice call data through the CS bearer in operation 1316 and PS bearer in operation 1317 without passing through UE2.

Figure 14:
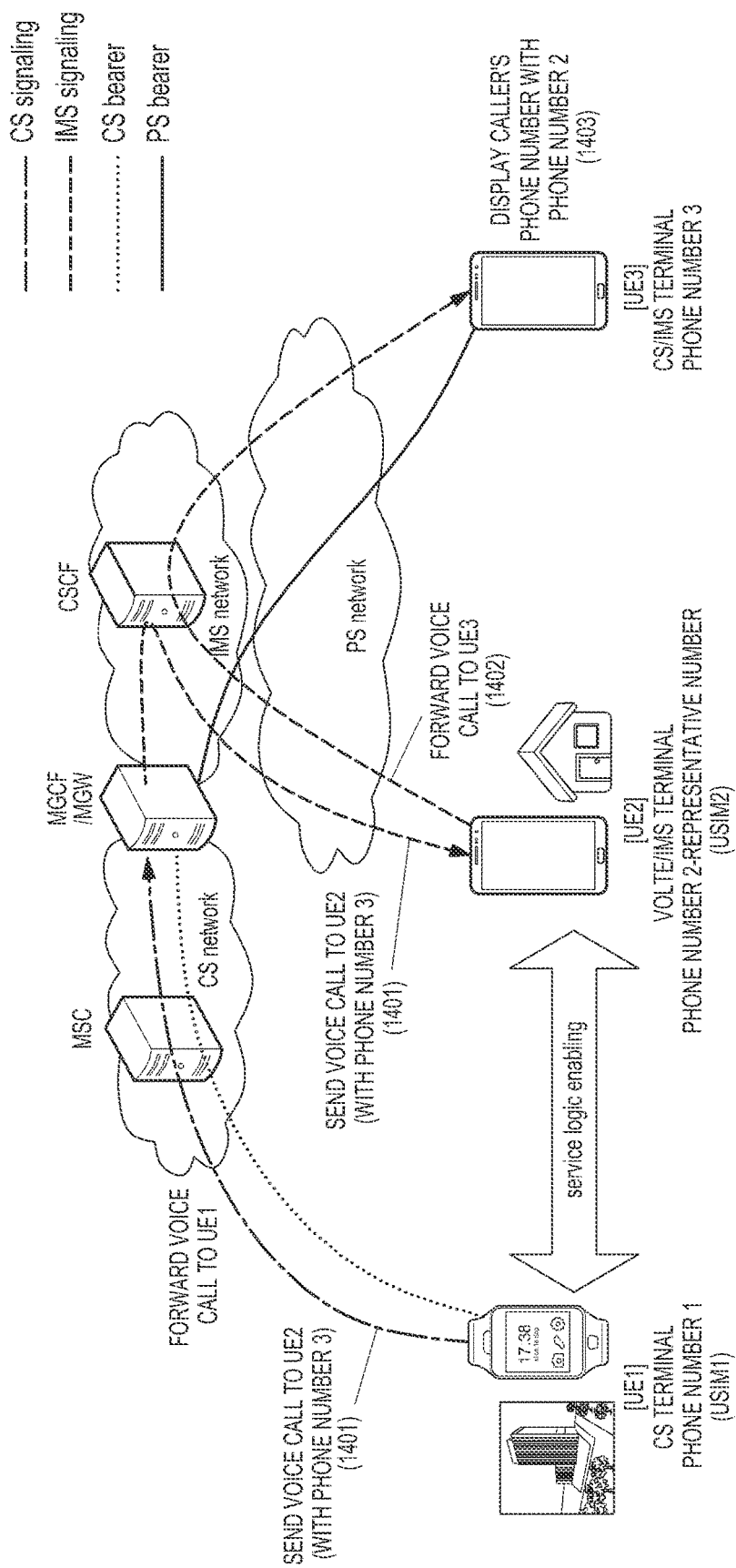
FIG. 14 illustrates a method of connecting a voice call when a representative terminal (UE2) receives a voice call setup request from an auxiliary terminal (UE1) in a call forwarding service method according to a second embodiment of the present disclosure.

FIG. 14 illustrates a method of connecting a voice call when a representative terminal (UE2) receives a voice call setup request from an auxiliary terminal (UE1) in a call forwarding service method according to a second embodiment of the present disclosure.

Referring to FIG. 14, the UE2 transfers the received voice call setup request to an opposite party's terminal (UE3) so that UE1 and UE3 directly connect a voice call in a call forwarding service method. When UE1 and UE2 are using a call forwarding service, UE1 transmits a CS voice call to UE2 using a phone number 3. The CS voice call request is transferred through an MSC, MGCF/MGW, and CSCF to UE2 in operation 1401. UE2 identifies that the UE that has transmitted the received CS voice call is UE1 and transmits an IMS voice call to UE3 that corresponds to the phone number 3 of the CS voice call in operation 1402. The IMS voice call is then connected to UE3 through the CSCF, and the phone number 2 of the representative terminal UE2, not the phone number 1 of UE1 that has transmitted the voice call is displayed on the screen of UE3 in operation 1403.

Figure 15:
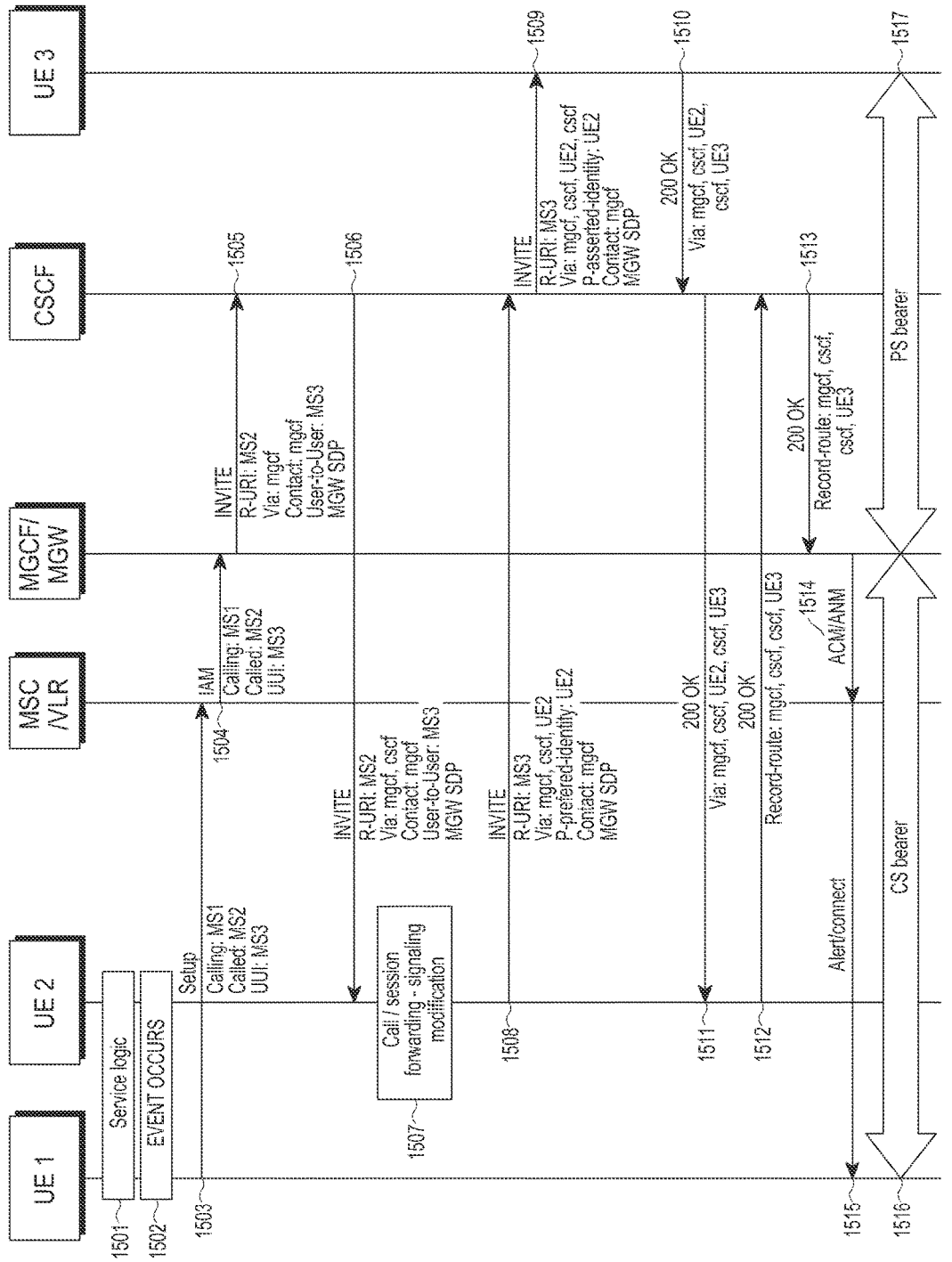
FIG. 15 illustrates a method of connecting a voice call when a representative terminal (UE2) receives a voice call setup request from an auxiliary terminal (UE1) in a call forwarding service method according to a second embodiment of the present disclosure.

FIG. 15 illustrates a method of connecting a voice call when a representative terminal (UE2) receives a voice call setup request from an auxiliary terminal (UE1) in a call forwarding service method according to a second embodiment of the present disclosure.

Referring to FIG. 15, UE1 and UE2 have a VCM. The UE2 transfers the request for voice call from UE1 to an opposite party's terminal UE3 so that UE1 and UE3 directly connect a voice call in a call forwarding service method. The VCM of each terminal identifies criteria for initiating a call forwarding service in the terminal in operation 1501. Thereafter, when an event occurs meeting criteria for initiating a call forwarding service in operation 1502, UE1 transmits a setup message to an MSC/VLR to transmit a CS voice call in operation 1503. In this case, the setup message contains a phone number (Calling: MS1) of UE1 that is a transmitting terminal, a phone number (MS2) and User to User Information (UUI) field of UE2 that is a receiving terminal. The UUI field includes a phone number (MS3) of UE3 that is a terminal to which the CS voice call should be finally transferred. The MSC/VLR transmits an IAM message containing the same information as the INVITE to the MGCF/MGW in operation 1504. The MGCF/MGW transfers an INVITE message to the CSCF in operation 1505. The MGCF converts CS signaling into IMS signaling and connects a CS bearer in operation 1516 and a PS bearer in operation 1517. To that end, the INVITE message of operation 1505 converted by the MGCF contains MGCF information (Contact: mgcf).

Further, the value included in the UUI field of the IAM message 1504 is included in the User-to-User header of the INVITE message 1505. The CSCF transmits the INVITE message to UE2 in operation 1506. The VCM of UE2 receives an IMS voice call connection request message, and then, prepares for transfer of the voice call to UE3 in operation 1507. The VCM of UE2 then transmits the INVITE message to UE3 in operation 1508. In this case, the VCM of UE2 puts the MGCF information (Contact: mgcf) that has been included in the INVITE message received from the CSCF in operation 1506, rather than putting its own information (information on UE2) in the INVITE message. The INVITE message is transferred to UE3 through the CSCF by an existing IMS signaling method in operation 1509. Through this process, UE1 establishes a PS bearer 1517 through which to directly communicate voice call data with UE3.

UE3 responds to the voice call connection request message. The response message is transferred to UE1 according to an existing signaling process in operations 1510, 1511, 1512, 1513, 1514, and 1515. Through this process, UE1 establishes a CS bearer in operation 1516 through which to directly communicate voice call data with UE3. Thereafter, UE3 and UE1 may directly communicate voice call data through the CS bearer in operation 1516 and the PS bearer in operation 1517 without passing through UE2.

A method for providing a network-based call forwarding service is described below.

Proposed is a method in which when an event meeting criteria for initiating a call forwarding service occurs, a voice call representative terminal automatically performs registration in a call forwarding service that is an additional service of an existing network and starts and terminates the service, according to a third embodiment of the present disclosure. When the event occurs, the VCM of UE2 that is a representative terminal performs registration in the call forwarding service so as to forward a voice call that is transferred to UE2 using the phone number 1 of UE1 that is an auxiliary terminal. Further, the auxiliary terminal, not the representative terminal, may directly perform registration in the call forwarding service and request to start a call forwarding service. In such case, the network entity to which the auxiliary terminal transmits a request for call forwarding service may be varied, and the phone number of the auxiliary terminal, which is the content registered for the call forwarding service should be included.

According to the third embodiment of the present disclosure, UE1 is an auxiliary terminal and is a CS terminal with a phone number 1 (MSISDN1). UE2 is a representative terminal and is a VoLTE/IMS terminal. UE2 has a phone number 2 (MSISDN2). UE3 is a transmitting terminal and is a CS/IMS terminal. UE3 has a phone number 3. Although an example in which UE3 is an IMS terminal is described in accordance with the third embodiment of the present disclosure, UE3 may be a terminal that is not an IMS terminal.

Figure 16A:
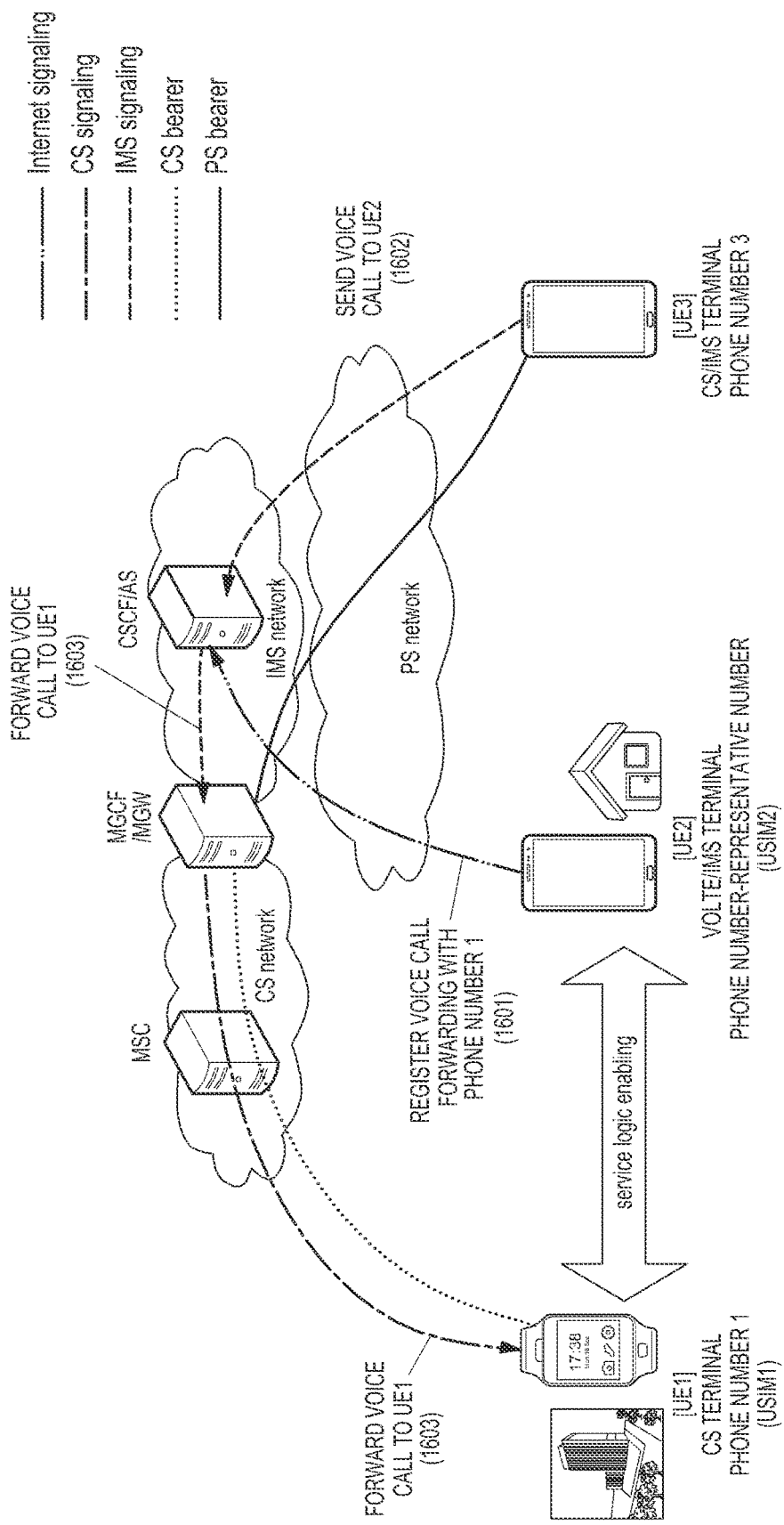
FIG. 16A is a view illustrating a signaling pathway and a pathway through which data is transmitted when a voice call is received by a representative terminal in a call forwarding service method according to a third embodiment of the present disclosure.

FIG. 16A is a view illustrating a signaling pathway and a pathway through which data is transmitted when a voice call is received by a representative terminal in a call forwarding service method according to a third embodiment of the present disclosure.

Referring to FIG. 16A, when an event corresponding to a call forwarding service occurs while UE1 and UE2 are using a call forwarding service, UE2 registers the phone number of UE1 in the call forwarding service and requests to start a call forwarding service in operation 1601. When UE3 transmits a voice call using the phone number 2 of UE2 in operation 1602, the call forwarding server transfers the voice call to UE2 to UE1 according to the service registration information in operation 1603.

Figure 16B:
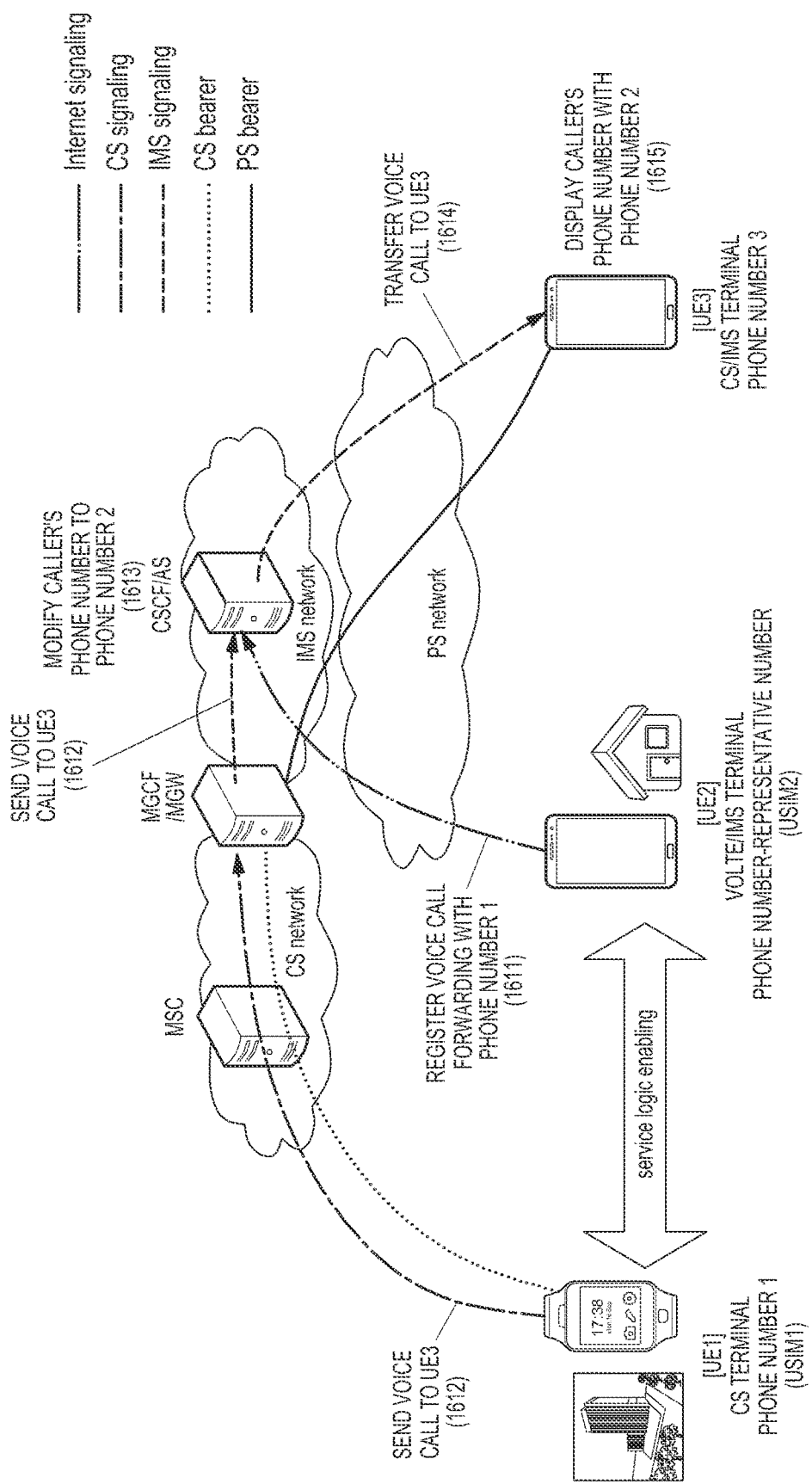
FIG. 16B is a view illustrating a signaling pathway and a pathway through which data is transmitted when an auxiliary terminal transmits a voice call in a call forwarding service method according to a third embodiment of the present disclosure.

FIG. 16B is a view illustrating a signaling pathway and a pathway through which data is transmitted when an auxiliary terminal transmits a voice call in a call forwarding service method according to a third embodiment of the present disclosure.

Referring to FIG. 16B, when an event corresponding to a call forwarding service occurs while UE1 and UE2 are using a call forwarding service, UE2 registers the phone number of UE1 in the call forwarding service and requests to start a call forwarding service in operation 1611. When UE1 transmits a voice call to UE3 in operation 1612, the call forwarding server modifies the caller's number to the representative phone number of UE2, MSISDN2, in operation 1613 and transfers the voice call from UE1 to UE3 using the phone number of UE2 that is the modified caller's number in operation 1614. Thereafter, the phone number of UE2, not UE1, is displayed on the screen of UE3 in operation 1615.

Figure 17A:
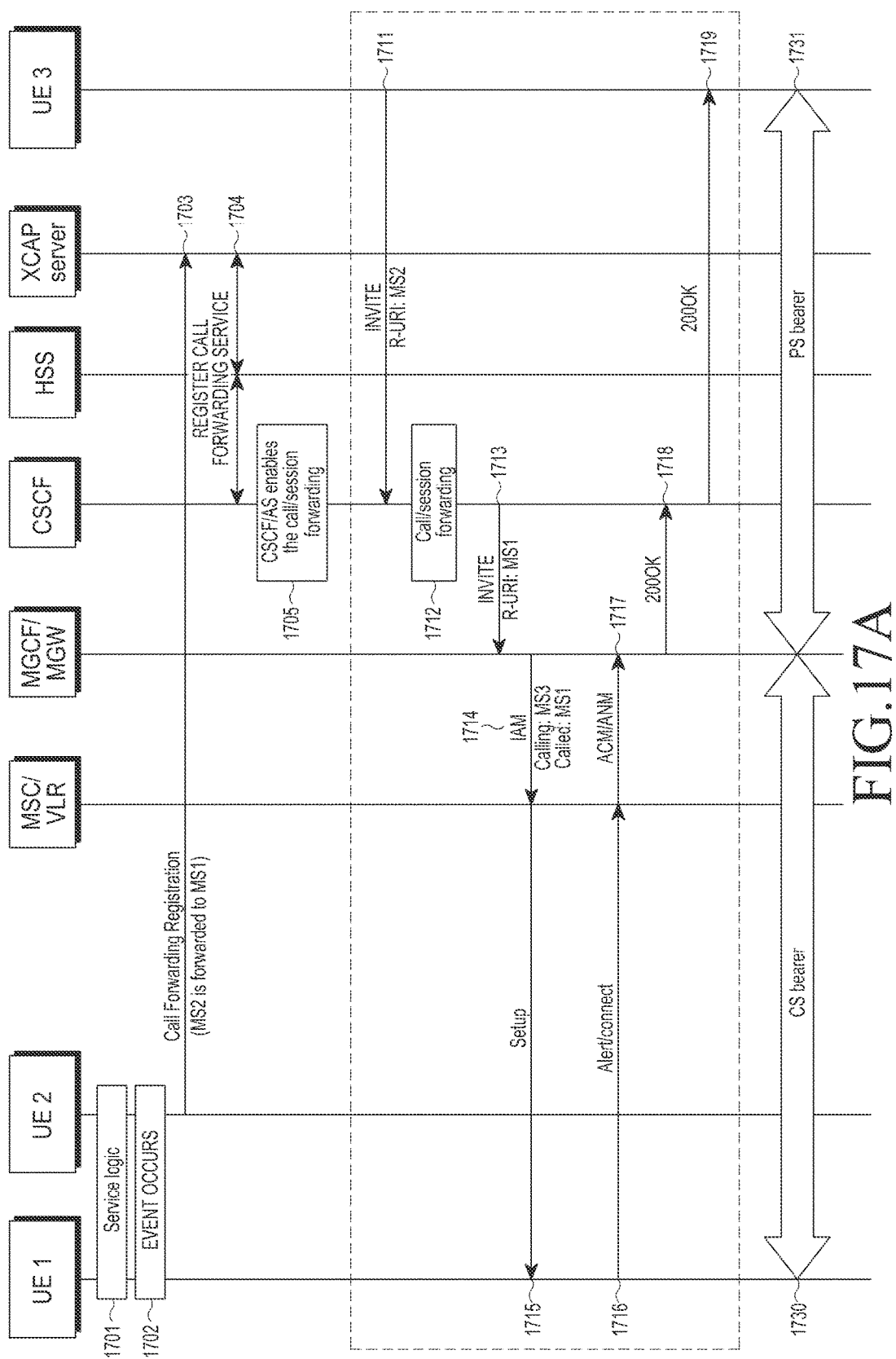
FIGS. 17A and 17B are views illustrating a process for performing call forwarding in a call forwarding service according to a third embodiment of the present disclosure.
Figure 17B:
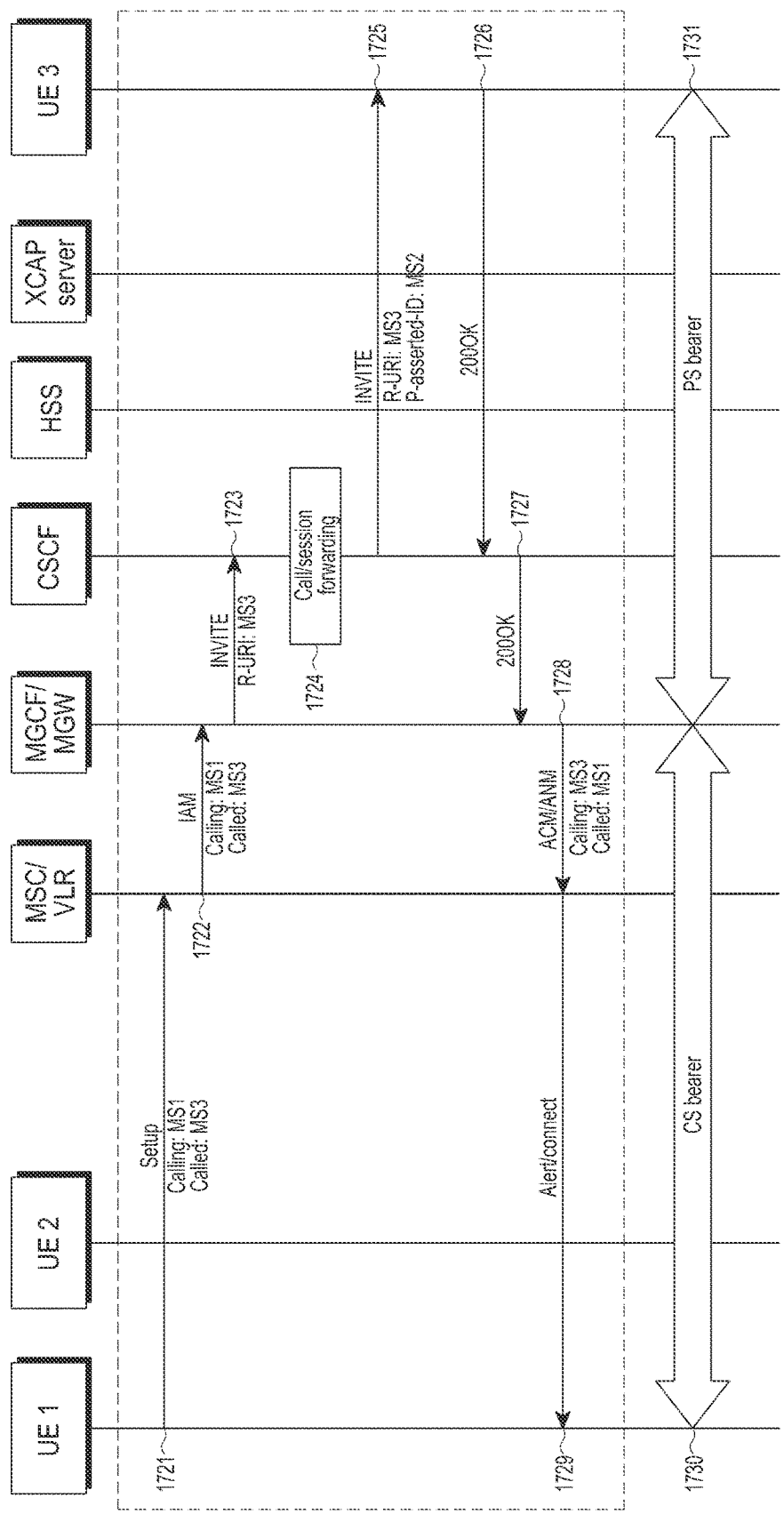

FIGS. 17A and 17B are views illustrating a process for performing call forwarding in a call forwarding service according to a third embodiment of the present disclosure.

Referring to FIGS. 17A and 17B, UE1 and UE2 have a VCM. The VCM of each terminal identifies criteria for initiating a call forwarding service in the terminal in operation 1701. Thereafter, when an event meeting criteria for initiating a call forwarding service occurs in operation 1702, UE2 registers, in the call forwarding server, a call forwarding service for transferring a voice call received using the phone number, MSISDN2, of UE2, by using the phone number, MSISDN1, of UE1 and requests to start a call forwarding service in operation 1703. The call forwarding server transfers call forwarding service-related information to the CSCF and requests to start a call forwarding service in operation 1704. A home subscriber server (HSS), a call forwarding server, and a CSCF may be involved in the process of transferring the call forwarding service-related information. When receiving the call forwarding service-related information, the CSCF enables the call forwarding service in operation 1705.

Thereafter, when UE3 transmits a request for a voice call to UE2 to the CSCF in operation 1711, the CSCF sets the recipient of voice call from UE3 to MSISDN1, i.e., UE1, according to the registered call forwarding service information in operation 1712. In this case, during the process of performing the call forwarding service, the CSCF, HSS, and call forwarding server may be involved. The CSCF transfers the recipient-varied voice call to UE1 through the MGCF/MGW and MSC/VLR in operations 1713, 1714, and 1715. UE1 transmits a response message accepting the voice call to UE3 through the MSC/VLR, MGCF/MGW, and CSCF in operations 1716, 1717, 1718, and 1719. Through such process, a CS bearer in operation 1730 and a PS bearer in operation 1731 are set up between UE1 and UE3.

Meanwhile, when UE1 transmits a voice call to UE3 after registering a call forwarding service in operation 1712, the voice call is transferred to the CSCF through the MSC/VLR and MGCF/MGW in operations 1721, 1722, and 1723. The CSCF changes the caller's number of the voice call to MSISDN2 according to the registered call forwarding service information in operation 1724. The CSCF includes the changed caller's number in the P-asserted-ID of the INVITE message that is a voice call request message of the IMS and transmits the same to UE3 in operation 1725. The HSS, call forwarding server, and CSCF may be involved in the process of performing the call forwarding service. When receiving the voice call, UE3 transmits a response message accepting the voice call to UE1 through the CSCF, MGCF/MGW, and MSC/VLR in operations 1726, 1727, 1728, and 1729. Through such process, a CS bearer in operation 1730 and a PS bearer in operation 1731 are set up between UE1 and UE3.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for communicating a voice call by a plurality of terminals in a communication system, the method comprising:
setting up, by a first terminal that is a representative terminal for receiving a voice call, a function for using a call forwarding service with a second terminal that is an auxiliary terminal;
setting up, by the first terminal, a call forwarding application set comprising at least one application selected from a plurality of applications in the first terminal;
determining, by the first terminal, when an application in the first terminal is executed on the first terminal, whether the application is included in the call forwarding application set;
determining, by the first terminal, if the application is included in the call forwarding application set, whether a call forwarding service with the second terminal is being executed; and
executing, by the first terminal, unless the call forwarding service is being executed, the call forwarding service and transferring a voice call received by the first terminal to the second terminal while performing the application included in the call forwarding application set if the application is included in the call forwarding application set.

2. The method of claim 1, wherein the setting up of the function for using the call forwarding service comprises registering a short-range communication device or a sensor for receiving information on a distance between the first terminal and the second terminal in an operating system of the first terminal.

3. The method of claim 2, further comprising, when the distance between the first terminal and the second terminal is less than a threshold, if the call forwarding service with the second terminal is being executed, terminating, by the first terminal, the call forwarding service.

4. The method of claim 2, wherein the executing of the call forwarding service, unless the call forwarding service is being executed, and the transferring of the voice call received by the first terminal to the second terminal comprises:
identifying, by the first terminal, unless the call forwarding service is being executed, whether the first terminal is moved using the short-range communication device or the sensor; and
transferring, by the first terminal, unless the first terminal is not moved, the voice call received by the first terminal to the second terminal.

5. The method of claim 1, further comprising:
identifying, by the first terminal, when an application included in the call forwarding application set is terminated on the first terminal while the call forwarding service is being executed, whether there is an application currently being executed among the at least one application included in the call forwarding application set;
transferring, by the first terminal, when there is the application currently being executed among the at least one application included in the call forwarding application set, the voice call received by the first terminal to the second terminal; and
terminating, by the first terminal, unless there is the application currently being executed among the at least one application included in the call forwarding application set, the call forwarding service.

6. A terminal communicating a voice call in a communication system, the terminal comprising:
a communicating device configured to communicate a voice call;
an application performing device configured to perform a plurality of applications;
a short-range communication device configured to communicate data with another terminal using a short-range communication technology;
a voice call managing device configured to provide a call forwarding service transferring the voice call to the other terminal; and
an operating device configured to:
manage data communication among the voice call managing device, the application performing device, and the short-range communication device,
set up a call forwarding application set comprising at least one application selected from the plurality of applications,
determine, when an application among the plurality of applications is being executed, whether the application is included in the call forwarding application set, and
inform the voice call managing device that the application included in the call forwarding application set is executed,
wherein the voice call managing device is further configured to:
determine whether the call forwarding service is being executed when receiving a message indicating that the application included in the call forwarding application set is executed from the operating device,
execute the call forwarding service unless the call forwarding service is being executed, and
transfer the voice call received by the communicating device to the other terminal while performing the application included in the call forwarding application set if the application is included in the call forwarding application set.

7. The terminal of claim 6, wherein the voice call managing device is further configured to register a short-range communication device or a sensor for receiving information on a distance from the other terminal in the operating device.

8. The terminal of claim 7, wherein the voice call managing device is further configured to:
determine, when receiving a message indicating that the distance from the other terminal is less than a threshold, if the call forwarding service is being executed, and
terminate the call forwarding service.

9. The terminal of claim 7, wherein the voice call managing device, when receiving the message indicating the distance from the other terminal is less than a threshold, unless the call forwarding service is being executed, is further configured to:
identify whether the terminal is moved through the operating device and a sensor configured to detect a motion or contact, and
transfer, if determining that the terminal is not moved, a voice call received by the communicating device to the other terminal.

10. The terminal of claim 6, wherein the voice call managing device, when an application included in the call forwarding application set is terminated while the call forwarding service is being executed, is further configured to:

identify whether there is an application currently being executed among the at least one application included in the call forwarding application set, when there is the application currently being executed among the at least one application included in the call forwarding application set, transfer the voice call received by the communicating device to the other terminal, and terminate, unless there is the application currently being executed among the at least one application included in the call forwarding application set, the call forwarding service.

11. The terminal of claim 10, wherein the voice call managing device is further configured to receive a message indicating that the application is executed or terminated through the operating device.

12. A method for communicating a voice call by a plurality of terminals in a communication system, the method comprising:

setting up, by a first terminal that is a representative terminal for receiving a voice call, a function for using a call forwarding service with a second terminal that is an auxiliary terminal and registering a call forwarding service with the second terminal in a server;

setting up, by the first terminal, a call forwarding application set comprising at least one application selected from a plurality of applications in the first terminal;

determining, by the first terminal, when an application in the first terminal is executed on the first terminal, whether the application is included in the call forwarding application set;

transmitting, by the first terminal, if the application is included in the call forwarding application set, a request for the call forwarding service to the second terminal to the server so that the server establishes a voice call bearer between the server and the first terminal and between the server and the second terminal; and transferring, by the first terminal, when receiving a voice call from a third terminal, the voice call from the third terminal to the second terminal through the voice call bearer between the server and the first terminal and between the server and the second terminal while performing the application included in the call forwarding application set if the application is included in the call forwarding application set.

13. The method of claim 12, wherein the registering of the call forwarding service comprises registering an internet protocol (IP) address, an identification (ID), and a phone number of a terminal.

14. The method of claim 12, further comprising, when transmitting a voice call from the second terminal, transferring, by the first terminal, the voice call transmitted from the second terminal to the third terminal through the voice call bearer between the server and the second terminal and between the server and the first terminal.

15. A method for communicating a voice call by a plurality of terminals in a communication system, the method comprising:

receiving, by a server, a call forwarding service registration request message from a first terminal that is a representative terminal for receiving a voice call and a second terminal that is an auxiliary terminal and registering the first terminal and the second terminal in a call forwarding service terminal list;

receiving, by the server, a call forwarding service request message from the first terminal detecting that an application included in a call forwarding application set is executed, the call forwarding application set comprising at least one application selected from a plurality of applications in the first terminal;

establishing, by the server, a voice call bearer between the first terminal and the second terminal; and receiving, by the server, a voice call transmitted from the third terminal through the established voice call bearer from the first terminal and transferring the voice call to the second terminal while performing the application included in the call forwarding application set if the application included in the call forwarding application set is executed.

16. The method of claim 15, wherein the call forwarding service registration request message comprises an internet protocol (IP) address, an identification (ID), and a phone number of a terminal transmitting the message.

17. The method of claim 15, further comprising:

receiving, by the server, a voice call transmitted from the second terminal through the established voice call bearer, and transferring, by the server, the voice call to the third terminal through the second terminal.

18. A terminal communicating a voice call in a communication system, the terminal comprising:

a communicating device configured to communicate a voice call; and a voice call managing device configured to:

provide a call forwarding service with an auxiliary terminal, set up a function for using the call forwarding service with the auxiliary terminal, set up a call forwarding application set comprising at least one application selected from a plurality of applications, determine when an application in the first terminal is executed on the first terminal, whether the application is included in the call forwarding application set, register the call forwarding service with the auxiliary terminal in a server, if the application is included in the call forwarding application set, transmit a request for the call forwarding service to the auxiliary terminal to the server to establish a voice call bearer between the server and the terminal and between the server and the auxiliary terminal, and transfer, when receiving a voice call from an opposite terminal, the voice call from the opposite terminal to the auxiliary terminal through the voice call bearer between the server and the terminal and between the server and the auxiliary terminal while performing the application included in the call forwarding application set if the application is included in the call forwarding application set.

19. The terminal of claim 18, wherein the voice call managing device is further configured to transfer an internet protocol (IP) address, an identification (ID), and a phone number for registering the call forwarding service.

20. The terminal of claim 18, wherein the voice call managing device, when receiving the voice call transmitted from the auxiliary terminal through the communicating device, is further configured to transfer the voice call transmitted from the auxiliary terminal to the opposite terminal through the voice call bearer established between the server and the auxiliary terminal and between the server and the terminal.

21. A server supporting a plurality of terminals to communicate a voice call in a communication system, the server comprising:
- a communicating device configured to communicate a message with the plurality of terminals; and
- a call forwarding device configured to:
  - provide a call forwarding service between the plurality of terminals,
- wherein the communicating device is further configured to:
  - receive a call forwarding service registration request message from a first terminal that is a representative terminal for receiving a voice call and a second terminal that is an auxiliary terminal, and
  - receive a call forwarding service request message to the second terminal from the first terminal detecting that an application included in a call forwarding application set is executed, the call forwarding application set comprising at least one application selected from a plurality of applications in the first terminal,
  - register, upon receiving the call forwarding service registration request message, the first terminal and the second terminal in a list of call forwarding service terminals,
  - establish, upon receiving the call forwarding service request message, a voice call bearer with the first terminal and the second terminal, and
  - receive the voice call transmitted from the third terminal through the established voice call bearer from the first terminal and to transfer the voice call to the second terminal while performing the application included in the call forwarding application set if the application included in the call forwarding application set is executed.

22. The server of claim 21, wherein the call forwarding service registration request message comprises an internet protocol (IP) address, an identification (ID), and a phone number of a terminal transmitting the message.

23. The server of claim 21, wherein the call forwarding device is further configured to:
- receive the voice call transmitted from the auxiliary terminal through the established voice call bearer, and
- transfer the voice call through the representative terminal to the opposite terminal.

* * * * *